US009792828B2

(12) United States Patent
Poor et al.

(10) Patent No.: US 9,792,828 B2
(45) Date of Patent: Oct. 17, 2017

(54) USE OF A RESOURCE ALLOCATION ENGINE IN PROCESSING STUDENT RESPONSES TO ASSESSMENT ITEMS

(71) Applicant: MCGRAW-HILL SCHOOL EDUCATION HOLDINGS LLC, New York, NY (US)

(72) Inventors: David Deas Sinkler Poor, Meadowbrook, PA (US); Randal B. Fry, Salinas, CA (US)

(73) Assignee: MCGRAW-HILL SCHOOL EDUCATION HOLDINGS LLC, New York, NY (US)

( * ) Notice: Subject to any disclaimer, the term of this patent is extended or adjusted under 35 U.S.C. 154(b) by 196 days.

(21) Appl. No.: 14/618,048

(22) Filed: Feb. 10, 2015

(65) Prior Publication Data

US 2015/0154879 A1 Jun. 4, 2015

Related U.S. Application Data

(63) Continuation of application No. 12/049,001, filed on Mar. 14, 2008, now abandoned.

(60) Provisional application No. 60/918,073, filed on Mar. 15, 2007.

(51) Int. Cl.
*G09B 7/06* (2006.01)
*G06K 9/18* (2006.01)
*G09B 7/02* (2006.01)
*G06K 9/46* (2006.01)

(52) U.S. Cl.
CPC ............ *G09B 7/06* (2013.01); *G06K 9/18* (2013.01); *G06K 9/46* (2013.01); *G09B 7/02* (2013.01)

(58) Field of Classification Search
CPC .................................. G09B 7/06; G06K 9/18
USPC .................................. 434/353–361; 382/216
See application file for complete search history.

(56) References Cited

U.S. PATENT DOCUMENTS

| | | |
|---|---|---|
| 4,478,584 A | 10/1984 | Kaney |
| 4,760,464 A | 7/1988 | Sakano |
| 5,011,413 A | 4/1991 | Ferris et al. |
| 5,085,587 A | 2/1992 | DesForges et al. |
| 5,099,340 A | 3/1992 | Kamada et al. |
| 5,103,490 A | 4/1992 | McMillin |
| 5,134,669 A | 7/1992 | Keogh et al. |
| 5,140,139 A | 8/1992 | Shepard |
| 5,184,003 A | 2/1993 | McMillin et al. |
| 5,194,966 A | 3/1993 | Quardt et al. |
| 5,211,564 A | 5/1993 | Martinez et al. |
| 5,291,592 A | 3/1994 | Kita |
| 5,371,673 A | 12/1994 | Fan |
| 5,420,407 A | 5/1995 | Grundy, Jr. |

(Continued)

*Primary Examiner* — Thomas Hong
(74) *Attorney, Agent, or Firm* — Rothwell, Figg, Ernst & Manbeck PC

(57) ABSTRACT

A resource allocation can be utilized to control resources to determine trustworthy item scores for a respondent's response to an assessment item. Embodiments may utilize one or more resources to extract the student response to an item, one or more resources to establish an item score for that item based on the extracted response, and one or more resources to evaluate the extracted or score and further utilize such resources until a trustworthy item score is established. Confidence indicators may be used for both digital representations of student responses and the scores derived from such digital representations of student responses.

2 Claims, 16 Drawing Sheets

(56) References Cited

U.S. PATENT DOCUMENTS

| | | | | |
|---|---|---|---|---|
| 5,434,931 | A | 7/1995 | Quardt et al. | |
| 5,452,379 | A | 9/1995 | Poor | |
| 5,664,076 | A | 9/1997 | Pluta et al. | |
| 5,672,060 | A | 9/1997 | Poor | |
| 5,711,673 | A | 1/1998 | Grundy, Jr. | |
| 5,869,789 | A | 2/1999 | Reid-Green | |
| 5,873,077 | A | 2/1999 | Kanoh et al. | |
| 5,991,595 | A | 11/1999 | Romano et al. | |
| 6,079,624 | A | 6/2000 | Apperson et al. | |
| 6,173,154 | B1 | 1/2001 | Kucinski et al. | |
| 6,256,399 | B1 * | 7/2001 | Poor | 382/100 |
| 6,295,439 | B1 | 9/2001 | Bejar et al. | |
| 6,366,760 | B1 | 4/2002 | Kucinski et al. | |
| 6,459,509 | B1 | 10/2002 | Maciey et al. | |
| 6,466,683 | B1 | 10/2002 | Poor | |
| 6,526,258 | B2 | 2/2003 | Bejar et al. | |
| 6,552,829 | B1 | 4/2003 | Maciey et al. | |
| 6,558,166 | B1 | 5/2003 | Clark et al. | |
| 6,684,052 | B2 | 1/2004 | Kucinski et al. | |
| 6,918,772 | B2 | 7/2005 | Clark et al. | |
| 6,961,482 | B2 | 11/2005 | Knowles | |
| 6,988,895 | B1 | 1/2006 | Lamarche et al. | |
| 7,020,435 | B2 | 3/2006 | Moulthrop et al. | |
| 7,054,464 | B2 | 5/2006 | Poor | |
| 7,123,764 | B2 | 10/2006 | Kirk et al. | |
| 2004/0018480 | A1 * | 1/2004 | Patz et al. | 434/362 |
| 2004/0126036 | A1 * | 7/2004 | Poor | 382/287 |
| 2004/0131279 | A1 | 7/2004 | Poor | |
| 2004/0185424 | A1 | 9/2004 | Kucinski et al. | |
| 2004/0202992 | A1 * | 10/2004 | Moulthrop et al. | 434/353 |
| 2004/0259067 | A1 | 12/2004 | Cody et al. | |
| 2006/0159345 | A1 * | 7/2006 | Clary et al. | 382/186 |
| 2007/0008564 | A1 | 1/2007 | Friedman et al. | |
| 2007/0286486 | A1 | 12/2007 | Goldstein | |

\* cited by examiner

FIG. 3A

7. Which is the correct formula for the area of a column?

● a = 2πr   ◉ a = hπd
471a        472a

8. Which is the correct formula for the area of a column?

● a = 2πr   ◉ a = hπd ✓
471b        472b

9. Which is the correct formula for the area of a column?

◉ a = 2πr   ● a = hπd
481a        482a

10. Which is the correct formula for the area of a column?

● a = 2πr   ◉ a = hπd ✓
481b        482b

| Item | 1 | | 2 | | 3 | | 4 | | 5 | | 6 | |
|---|---|---|---|---|---|---|---|---|---|---|---|---|
| Response | 1st | 2nd | 1st | 2nd | 1st | 2nd | 1st | 2nd | 1st | 2nd | 1st | 2nd |
| OMR Value | 15 | 0 | 8 | 0 | 15 | 8 | 0 | 0 | 15 | 15 | 15 | 12 |
| Derived Value | 1 | | 1 | | 1 | | ~ | | * | | 1 | |
| Confidence | Highest | | High | | High | | Medium | | Low | | Low | |

| Layer | Depth | Bits | Priority | Contents: OMR Resolver | Contents: CR Evaluator |
|---|---|---|---|---|---|
| 1 | 4 | 0-3 | 2 | Scanned Image | Scanned Image |
| 2 | 1 | 4 | 1 | Underlay template | Underlay template |
| 3 | 1 | 5 | 3 | First OMR Values | Hint |
| 4 | 1 | 6 | 4 | Second OMR Values | Rublic |
| 5 | 1 | 7 | 5 | Derived Data | Mask(s) |

USE OF A RESOURCE ALLOCATION ENGINE IN PROCESSING STUDENT RESPONSES TO ASSESSMENT ITEMS

CROSS REFERENCE OF RELATED APPLICATION

This application is a continuation under 35 U.S.C. §120 of U.S. patent application Ser. No. 12/049,001, filed, Mar. 14, 2008, which application claims the benefit under 35 U.S.C. §119 of the filing date of provisional patent application Ser. No. 60/918,073 filed Mar. 15, 2007, the respective disclosures of which are incorporated herein by reference.

BACKGROUND OF THE INVENTION

1. Field of Invention

This invention generally relates to capturing data from paper or other documents, and more specifically, to capturing student markings on assessment documents.

2. Description of the Background Art

The assessment industry is a multi-million dollar industry focused largely on assessing students in grades K through 12. With the advent of the No Child Left Behind Act (NCLB) of 2001, the extent and consequences of testing have increased dramatically. The increase in assessments has stressed the limits of the testing industry with more documents to be processed and ever increasing demands for faster document preparation and scoring. Such increasing demands have also resulted in assessment processing errors, some of which have gone undetected until after scores have been released to customers.

Most assessments for students in grades K through 12 are completed through the use of pencil marks on pre-printed assessment documents. With this type of document, test takers respond to assessment items ("items") by placing pencil marks on pre-printed assessment forms. The items consist largely of so-called selected response ("SR") items such as "multiple choice" items, in which a student selects from among presented item responses and indicates his or her response selection ("mark") by filling in a response "bubble" or other response area. Many assessments also include so-called constructed response ("CR") items for which the test taker creates his or her response through text, drawings, hand-written numbers, formulas, or other creation. (Note that this discussion adopts the assessment industry's interchangeable use of the terms "student", "test taker" and "respondent", and the interchangeable use of "assessment" and "test".)

With paper-based assessments, SR item responses are typically collected for scoring during a scanning process. Prior to scoring, document scanners are used to capture all successive sheets of completed paper assessment forms. Because all subsequent processing is conducted using the scan data resulting from this scan, the accuracy of SR response processing depends on accurate identification of intended student responses during this scanning process. Contrastingly, CR item responses instead continue to be scored primarily by human scorers, often by capturing an image using the same document scanners and then electronically presenting the captured image to a scorer, e.g., as taught by Poor, U.S. Pat. No. 5,672,060.

Current SR processing systems typically employ such document scanners in conjunction with a conventional OPTICAL MARK RECOGNITION ("OMR") technique. The OMR technique is directed at identifying student responses and for differentiating marks that are intended to be construed as responses ("intended marks") from marks that are not intended to be construed as responses (hereinafter, "unintended responses"). However, while such systems have benefited from increasingly sophisticated hardware and OMR techniques, they nevertheless depend on proper physical interaction between the scanning hardware and the paper assessment documents. As a result, current systems are inherently subject to mechanical and other errors. One vendor, for example, was unable to accurately capture SR item responses on a recent SAT®, the test formerly known as the Scholastic Achievement Test, the Scholastic Aptitude Test and the Scholastic Assessment Test. As was demonstrated, the conventional process of using a single pass of the sheet through a document scanner and a single, generalized extraction of an OMR value for each student response may fail to accurately identify student responses, let alone intended marks.

The scanning vendor for the mis-scored SAT®, has proposed to avoid future error by re-loading the paper into the same hardware scanner and repeating the same hardware scanning for all documents for a second time in a concurrent manner with the first scanning. However, since some documents may be improperly read by the vendor's scanning systems, passing the documents through the same scanner in the same manner for a second time may well reproduce the very same or similar failures.

This inventor may instead propose avoiding similar errors by conducting re-scanning using a different scanner, scanner settings or scanner type, or further, re-scanning only applicable portions of the targeted documents (e.g., using questionable or other targeted results, sampling, scorer, scorer class or resource suitability, SR response element localization and/or other criteria). However, the increased time and cost of even this inventor's proposal would likely meet some disapproval in the highly competitive assessment industry.

Accordingly, there remains a need for data capture systems and methods that provide for more accurately determining intended student responses while enabling one or more of the above and/or other problems of conventional or other response capturing systems to be avoided.

SUMMARY OF THE INVENTION

One solution embodying aspects of the present invention is based on the conditional or non-conditional use of multiple selectable processes to extract and/or otherwise process OMR data, typically using only a single pass through a document scanner. Additional aspects of the invention may include the use of a resource allocation system to control multiple extractions of OMR and/or other processes, and the use of comparative and/or non-responsive mark evaluation, among others.

Some embodiments embodying aspects of the present invention provide for determining more trustworthy data and for more effectively utilizing available resources to enable more trustworthy data determination. Some embodiments also provide for extracting data from target documents by more accurately identifying marks on such document and more accurately differentiating between intended marks (and/or various types of such marks) and other marks. Such data extraction may be determined using only a single scan of a corresponding assessment or other target document portion, using only inexpensive scanning systems and/or non-precision paper, and/or in conjunction with hardcopy, electronic or combined source documents, among other aspects, thereby enabling problems of conventional or other response capturing systems to be avoided and/or further advantages to be achieved.

In the case of student SR responses affixed to an assessment document, intended marks are often pencil marks made by a student to show an intended response and the "other" marks may include stray marks, incomplete marks, erasures, cross-outs, improperly provided marks, distortions due to damaged documents, contamination, and so on, created either during the manufacturing process or afterwards. More generally, such marks are a subset of marks that may be processed using OMR, and the systems and methods may apply to all marks that may be processed using OMR and/or other extraction processing techniques in applications such as demographics, votes, numeric grids, survey items, document identifying information, and so on.

Some embodiments more specifically provide for extracting representative information ("extraction processing") from scan data of a single scan of one or more target marks affixed to a portion of at least one source document. The techniques in a more specific embodiment include at least one OMR technique, and the marks may include preprinted/added markings, bar codes, stickers, other devices, icons or other written or other target data that may be affixed to a paper or electronic source document portion and extracted using such techniques. In other embodiments, the techniques may also include evaluating scoring or other performance-related evaluating, optical character recognition ("OCR"), OMR, media processing and/or other non-OMR extraction processing techniques.

Some embodiments also provide for conducting at least two different extraction processing techniques, also known as multiple extraction processing ("MEP"). The multiple extraction processing may be conducted in a non-conditional or conditional manner, for example, enabling one or more subsequent extraction processing instances to be avoided where an initial or other current instance is determined to be sufficiently reliable or performing a subsequent extraction processing instance may not substantially improve reliability or is otherwise determined to be unnecessary (i.e., or enabling or conducting such processing where a current instance is determined to be insufficiently reliable or a subsequent instance may substantially improve reliability or is otherwise determined to be necessary). The source document in one embodiment may include a paper assessment form and may, in other embodiments, include hardcopy, electronic or combined assessment documents and/or other learning other (multi)media or other document types.

In the case in which the multiple extraction is based on a single scan of a paper document (i.e., the paper document is processed by a scanner one time with at least one and conditionally two or more resulting extraction processes), the multiple extraction is also referred to herein as "redundant" and may be alternatively referred to as "redundant data capture" or "redundant extraction processing".

Extraction processing embodiments may also provide for determining a confidence indicator indicating the extent to which the extracted data may be deemed reliable and trusted ("extraction confidence indicator"). Typically, one indicator is determined for each data element (e.g., mark) extraction and the indicator typically remains unmodified despite subsequent processing results.

Some embodiments also provide for multiple "derived data extraction processing" in which data from extraction processing is converted into meaningful data that may be used, for example, to identify a student, student group or other student-related characteristics, to identify a student's response to an item, or to assign a score or other evaluation to a student's response to an item or items. Such derived data are often expressed in terms of text and, as in the example of OMR, are often based on multiple extracted data points from specified sets of extracted data. As with extraction processing, derived data extraction processing embodiments may also provide for a confidence indicator ("derived extraction confidence indicator" or simply "derived confidence indicator"), typically for data element derivation.

Embodiments may also include "evaluation processing". Evaluation processing may be based on a single extraction processing instance or multiple extraction processing instances, and may utilize one or more confidence indicators ("evaluation confidence indicators"), if such indicators have been determined. The evaluation processing may be used to determine whether or the extent to which the extracted data may be trusted and/or utilized. If the results of the evaluation processing are not within (or "outside") established criteria, embodiments provide for conducting additional processing using OMR and/or other processes not already performed and/or re-using one or more of the same processes but with different control parameters ("additional extraction processing" that may include one or more of extraction, deriving, evaluating or other related processing).

Evaluation processing may conditionally utilize derived data from one or more derived data extraction processing. For example, when there is a set of finite responses for an item, OMR techniques may be used within the extraction process to identify the presence or absence of a potential mark within each response area. Such identification may include a darkness and/or other classification of a found mark. The intended single response to the item or absence thereof may be derived by identifying each possible mark area within the item response area. As with an initial extraction, a confidence indicator may be determined for each element of derived data. If the results of the evaluation processing are not within established (evaluation) criteria, embodiments provide for conducting additional (extraction) processing using OMR or other processes not already performed and/or re-using one or more processes with different control parameters. Evaluation processing embodiments may also be conducted using further information, for example, by comparing absolute or relative scoring of same or different item types, one or more non-current student responses, cluster analysis, other student or student group related information, document damage/deterioration, and so on, or some combination.

Such additional processes may, for example, include one or more of additional extraction processing, flagging such discrepancy, allocating automatic (e.g., programmatic) or human review resources for conducting one or more of further review, re-scanning/re-evaluating using a same or different scanning/evaluating mechanism, determining a source of a discrepancy or failure, otherwise controlling or causing control of system components, and so on. In embodiments utilizing a resource allocation engine, the determination of appropriate additional processing may be conducted by a resource determination process which may be internal or external to the resource allocation engine itself.

Embodiments may include a determination of "untrustworthy" extracted data or derived data as part of the evaluation processing. For instance, extracted data may be determined to be untrustworthy when the data is inappropriate generally or to a context, when the indicator is outside of acceptable limits, or the substantiality or degree(s) to which the data is appropriate or inappropriate or inside or outside of acceptable limits. (Thus, the trustworthiness or untrustworthiness may be absolute or relative.) One example would be in resolving a barcode: if the number of digits does not match the expected number of digits in the barcode, the result may be determined to be untrustworthy. If untrustworthy data is identified, additional processing such as that described above will generally be indicated and/or conducted.

Embodiments may also include a determination of "discrepancy", e.g., as part of the evaluation processing. For instance, a discrepancy may be determined when there are two or more extractions of a same mark and the extracted data and/or the corresponding indicators, if they exist, indicate different evaluation processing results. Such indication may be determined through a simple comparison, more complex business rules, and so on. One example would be in processing SR items using OMR. If the same SR response is extracted two or more times and the student's intended response is identified as two different selections, then the results are discrepant. If such a discrepancy is determined, then additional processing such as that described above will generally be indicated and/or conducted.

Some embodiments also provide for additional processing that may include enabling human review of extracted data using a multiple layer presentation interface. The multiple layer presentation provides for enabling one or more users or groups of users to review the results of single extractions or multiple extractions with or without corresponding indicators. The multiple extraction presentation in a more specific embodiment provides for presenting a composite image including one or more of template layers corresponding to one or more source document representations, response layers corresponding to extracted data, source layers corresponding to captured images of marks from which data are extracted, indicator layers corresponding to confidence indicators, and/or other layers such as those for hints, instructions, guides, determinations including discrepancies or untrustworthy classifications, and/or other information to place the other layers in context so that the human reviewer may take appropriate action. The interface also provides for modifying the presentation, e.g., according to portions of presented layers, reviewing marks and resolving discrepancies or untrustworthy determinations that may exist.

In one embodiment, a first extraction mechanism includes one or more scanner-based or other mechanical devices for controlling alignment and/or registration of at least one document sheet being scanned. The mechanical devices and/or further support software may also provide for conducting active controlling, e.g., detecting, correcting or rejecting a sheet based on sources of distortion that may occur as a result of the paper document scanning ("scan distortion"). The first extraction mechanism also includes a scanner for scanning one or more document sheets or a portion thereof in conjunction with the mechanical devices and/or further support software, and a first OMR engine for performing a first OMR extraction technique in conjunction with scanning a document. The first OMR extraction technique provides for determining a first OMR value corresponding to scan data of a targeted representative marking in a predetermined region of a scanned document. The marking may, for example, correspond to a user mark and/or a bar code corresponding to a use ("administration") of the document. The embodiment also includes a second OMR extraction mechanism based on the captured image of at least some portion of the document such as described in the co-pending application Poor, U.S. Patent Application 20040131279, now U.S. Pat. No. 7,573,616. The second OMR extraction mechanism may include a data processing system to account for one or more of alignment, registration, skew, stretch and offset of the document portion as needed before extracting targeted data from the scanned data. The embodiment may also include a data processing system for comparing the first and one or more subsequent extractions of targeted data to determine resulting data.

In a second embodiment, two or more different systems may each utilize their own processes to account for distortions and extract the data from a same scanned image.

In a third embodiment, the two processing methods may occur sequentially with the second process only being used if the first process fails some criteria for trustworthy data collection.

A fourth embodiment also provides for at least conditionally utilizing two or more extraction processes. In this embodiment, however, one or more of the extraction methods may provide for extracting the data "offline" after scanning a corresponding document or portion thereof.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only. In particular, both the summary of the invention and the abstract are to be treated as though they were part of the specification, and not be given added consideration as to the meaning of the claims.

BRIEF DESCRIPTION OF THE DRAWINGS

Figure 3A:
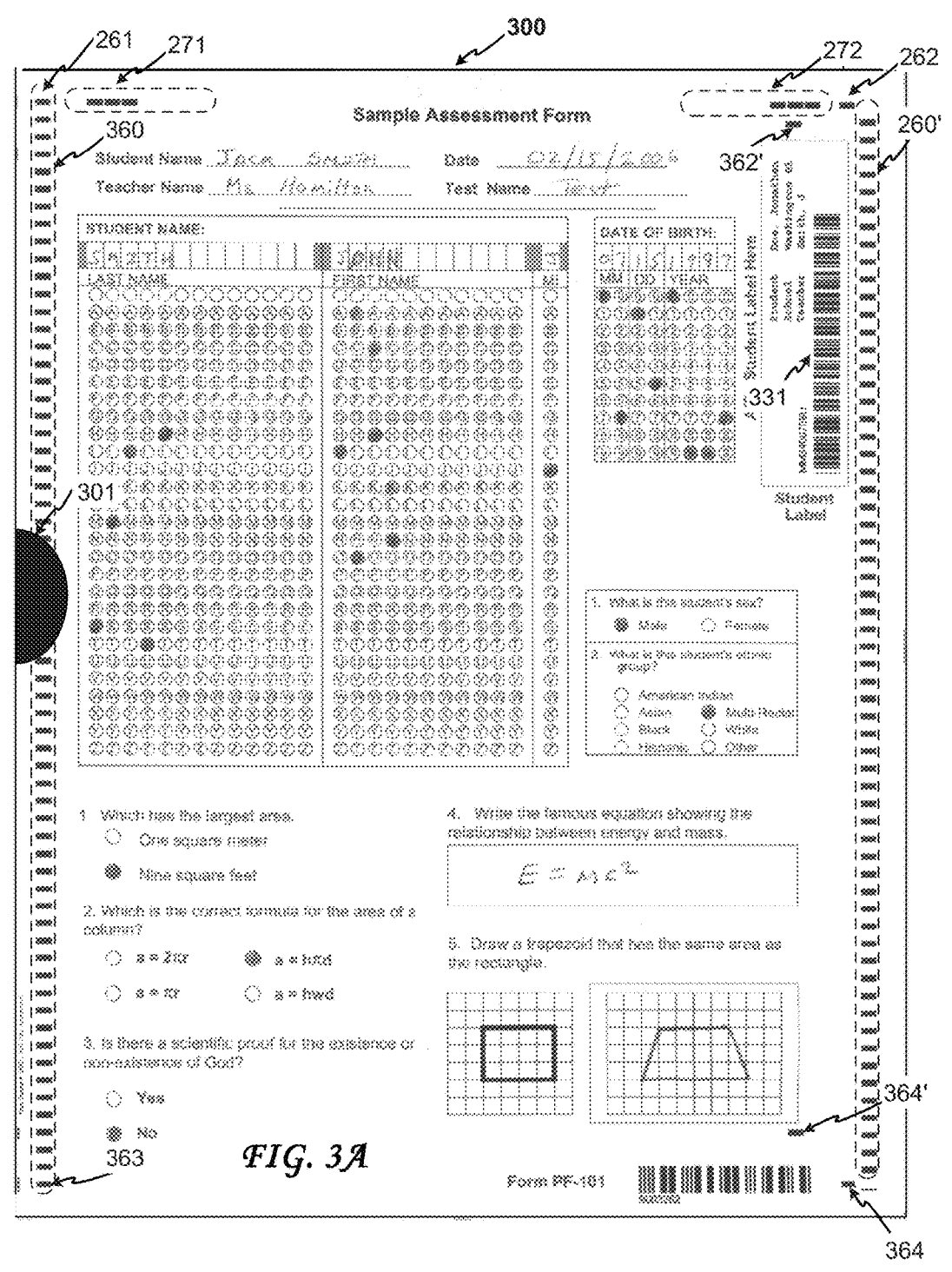

FIG. 3A illustrates a representative assessment document such as may be processed by embodiments of the invention and that includes multiple sets of timing tracks;

FIG. 7A illustrates a chart including criteria for a display of bitmapped images consisting of multiple layers mapped into each pixel of the bitmapped image for derived data extraction of an OMR field or a constructed response field, according to an embodiment of the invention;

FIG. 7B illustrates a display of bitmapped images consisting of multiple layers mapped into each pixel of the bitmapped image for derived data extraction of an OMR field, according to an embodiment of the invention;

DETAILED DESCRIPTION OF EMBODIMENTS OF THE INVENTION

Figure 1:
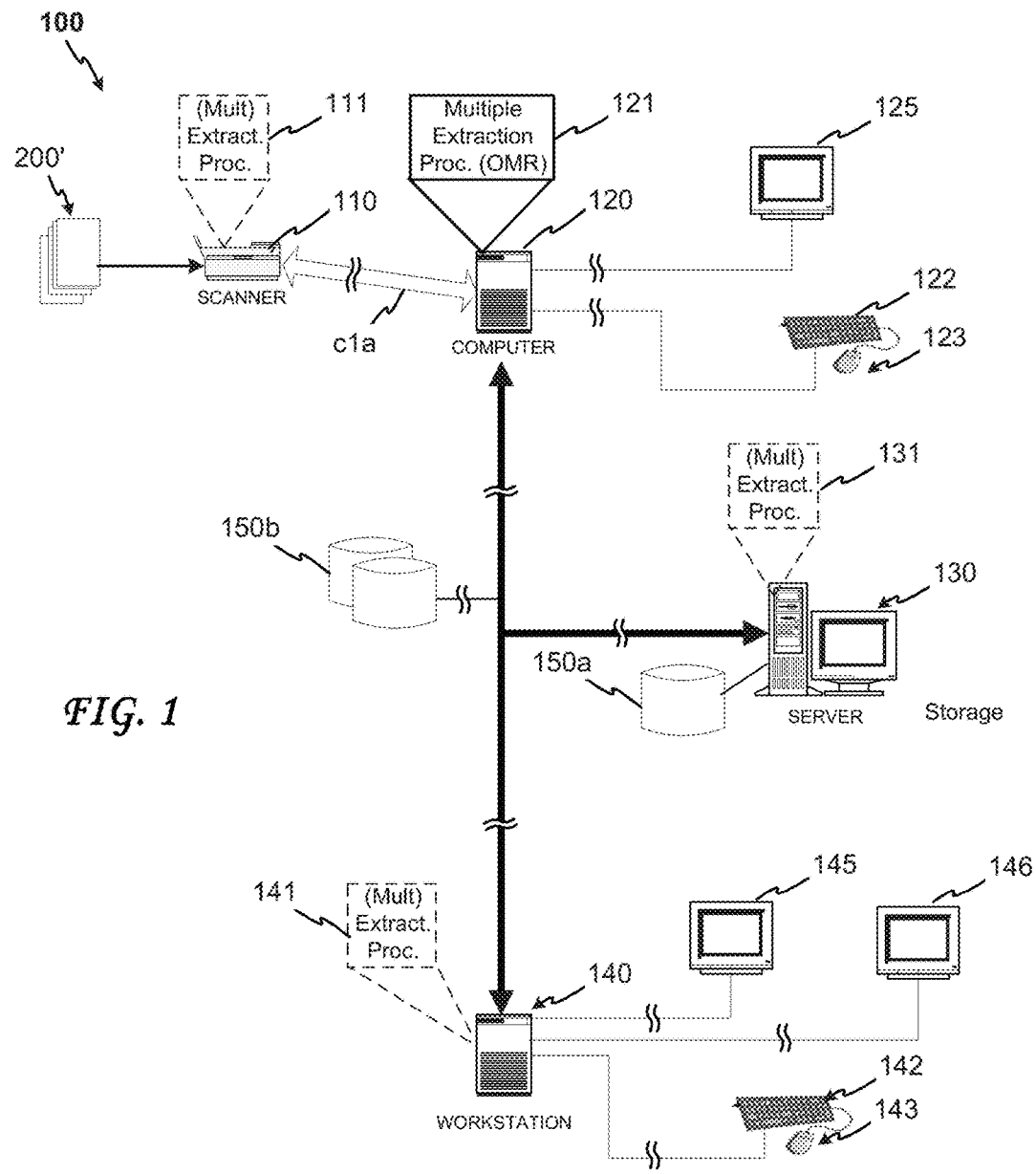
FIG. 1 is a flow diagram illustrating redundant data capture of a machine-readable assessment document, according to an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention may be practiced without one or more of the specific details, or with other apparatus, systems, assemblies, methods, components, materials, parts, and/or the like. In other instances, well-known structures, materials or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal digital assistant or "PDA" (also referred to as a personal information manager or "PIM"), smart cellular or other phone, so-called smart card, set-top box or any of the like. A "computer program" may include any suitable locally or remotely executable application, other program or other sequence of coded instructions which are to be loaded into a computer. Stated more specifically, a computer program includes an organized collection of instructions that, when executed, cause the computer to behave in a predetermined manner. The computer program may be programmable or operable in a sequential, object-based or other combinable manner, and may be implemented as static, add-in and/or mobile code portions. A computer program may contain a collection of ingredients (called "variables") and a collection of directions (called "statements") that tell the computer what to do with the variables. The variables may represent numeric data, text, audio, graphical images, other multimedia information or combinations thereof. If a computer is employed for synchronously presenting multiple video program streams, such as on a display screen of the computer, the computer would have suitable instructions (e.g., source code) for allowing a user to synchronously display multiple video program streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information in accordance with the embodiments of the present invention.

A "computer-readable medium" for purposes of embodiments of the present invention may be any medium that may contain, store, communicate, propagate, or transport the computer program for use by or in connection with the instruction execution system, apparatus, system or device. The computer readable medium may be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input/output (e.g., presenting) in accordance with various embodiments of the present invention.

The term "engine" is used to designate a particular computer program, stored procedure, or other algorithm that is designed to perform a specific function in that it receives input parameters and data and returns one or more data values representing the input data.

The term "or" as used herein is intended to include "and/or" unless otherwise indicated or unless the context clearly dictates otherwise. The term "portion" is further intended to include "in whole or contiguous or non-contiguous part" which part may include zero or more members, unless otherwise indicated or unless the context clearly dictates otherwise. The term "multiple" is intended to include at least one and, at least conditionally, two or more unless otherwise indicated or the context clearly indicates otherwise. The term "multimedia" may include one or more media types unless otherwise indicated or the context clearly indicates otherwise. The term "system" as used herein should be construed as including one or more of hardware or software device components or some portion or combination thereof unless otherwise indicated or the context clearly indicates otherwise. The terms "student", "test taker" and "respondent" may further be used interchangeably, as may the terms "learning" and "education", unless otherwise indicated or the context clearly indicates otherwise.

Also note that the descriptions of different embodiments provide clear delineation among extraction processing, derived data extraction processing, evaluation processing, and additional (multiple extraction) processing to provide clarity in the explanations of the various embodiments. However, the functionality covered by these different designations may be combined, reordered, or otherwise co-mingled or divided according to the needs of any particular embodiment, and a reference to one or more of these or other such processing may be included as "multiple extraction processing". Likewise, examples of multiple extraction processing that are more consistently posed in conjunction with a more specific case of student responses to assessments may provide for better understanding of the invention. However, aspects of the invention may apply to a wide variety of extraction, data collection, scoring, performance/user-interaction evaluation or other "tabulation", or other applications, only a few of which may be specifically noted herein. Therefore, a more inclusive class of "target document users" (e.g., including but not limited to preparers, administrators, readers or other reviewers, voters, applicants, actual/potential customers, clients, trainees, SMEs, devices, and so on) may also be applicable to these or other examples, so long as such users may cause marks to become physically, associatively or otherwise affixed to one or more target hardcopy/electronic documents such that extraction or other processing in accordance with an embodiment of the invention may be conducted. A more specific class of "responding users" may also be applicable and may include but is not limited to students. Such reference should not be construed as limiting.

Turning now to FIG. 1, there is seen a multiple extraction processing system according to an embodiment of the invention. System 100 provides for performing various embodiments of the invention that may utilize multiple extraction processing to extract OMR or other data. Techniques other than OMR may also be used. Such other techniques (e.g., see below) are typically used in conjunction with OMR and generally using OMR in an initial, or at least one subsequent extraction processing instance. More specifically, multiple extraction processing system ("multiple extraction system") 100 may perform redundant extraction processing that utilizes two or more different extraction techniques on a target document portion based on a single scan of the target document portion. In one embodiment, at least some portion of at least one side of one sheet of an assessment document 200' is scanned using an optical scanning device 110. One or more (multiple) extraction processing engines ("multiple extraction processors") may be included within scanner 110 such that the resulting scanning system may conduct extraction processing utilizing one or more OMR techniques to process potential marks within the appropriate portion(s) of the document.

As part of the scanning process, one embodiment provides for a scanner 110 capturing a digitized image of at least a portion of a document 200' and transferring the captured digitized image to an associated computer 120 that is coupled to scanner 110 and provides for conducting (multiple) extraction processing, e.g., by invoking a multiple extraction processor. One or more extraction processes may be performed by computer 120, which processes may include utilizing one or more OMR techniques to process potential marks that may be represented by pixels within the digitized image and may correspond to respective locations on the document. (Such locations may further correspond to the above noted document portion or portions.) In the multiple extraction system 100 embodiment shown in FIG. 1, the digitized image may be transferred to a digital storage medium (e.g., 150a and/or 150b) that may also be coupled to one or more other computers or server 130. One or more extraction processes may also be performed by one or more other computers, e.g., 130, which processes may utilize one or more OMR techniques to process potential marks as represented by the pixels within the digitized image by accessing the stored image from the computer coupled to the scanner or by accessing the stored image transferred from the computer to a local digital storage medium. (It will be appreciated that at least one external storage medium may also be used.)

In one embodiment, scanner 110 conducts a first extraction process and transfers resulting OMR values to computer 120. A second extraction process is also conducted corresponding to the same captured digitized image by computer 120 (which is coupled to scanner 110) or by another computer or server (e.g., 130) that is also coupled to scanner 110 or otherwise has access to the captured digitized image.

In a second embodiment, two different extraction processes each utilize the captured digitized image. One or both of the extraction processes may be conducted by computer 120, one or both of the extractions may be conducted by one or more other computers that have access to the captured digitized image 130 or some combination may be used. (It will become apparent that various embodiments may also conditionally or non-conditionally conduct extraction processes such that one, two or more than two extraction processes may be performed, and that the case of two extraction processes merely provides a more typical example of a fully or partially redundant extraction processing case.)

In a third embodiment, two or more extraction processing instances may occur sequentially. A first extraction process is always performed in this embodiment, either within scanner 110, computer 120 or within another computer that has access to the captured digitized image. After the first extraction is complete, an evaluation process is conducted, either by computer 120 or by another system 100 computer. The evaluation process may be conducted according to the extracted data and/or a confidence indicator indicating confidence in the trustworthiness of a corresponding extraction if such an indicator was created for the first extraction process (e.g., see below). If the evaluation process determines that the extracted data do not meet a predefined criteria for successful (or sufficiently "trustworthy") data extraction, then a second extraction process is performed.

A fourth embodiment also provides for utilizing two or more extraction processes. In this embodiment, however, one or more of the extraction process instances may provide for extracting data "offline" after scanning a corresponding document or portion thereof. Such an embodiment may be combined with any of the above embodiments and will typically be used as an "additional process" (or "additional multiple extraction process") which is invoked when an evaluation process determines that one or more additional extraction processes are needed to achieve successful data extraction (e.g., see above). One such offline process is achieved by causing human evaluators ("reviewers") to review either the captured digitized image or the original document and enter an appropriate determination or code. Such human review is typically conducted in conjunction with a computer 140 and an appropriate display mechanism 145 and data input device or devices, such as one or more of a keyboard, mouse, touch screen, digitized palette, voice recognition system, and so on (e.g., 142, 143). When the captured digitized image is utilized to display a representation of some portion of a target document, a separate display 146 may be employed. Other offline additional processes may include utilizing the same scanner 110 (e.g., in conjunction with different control parameters) or another scanner to scan at least some target document portion so that reliable data may be obtained. In other embodiments, the offline process may be conducted by human, electronic or combined mechanisms.

(Note that, as with other figures, system 100 components are merely illustrative and may indicate more than one corresponding, though not necessarily identical, component. For example, scanner 110 illustrates one or more scanners of the same or different types, one or more of which may provide for conducting various multiple extraction processing. It will also become apparent that additional processing may be conducted in different manners or according to different criteria. For example, a system 100 computer may conditionally or non-conditionally provide for directly or indirectly controlling scanner 110 or some other scanner, e.g., by sending control information to scanner 110 or flagging a scanner operator to control a corresponding scanner via coupling c1a. (Such control and/or flagging may be conducted in any suitable conventional or other manner.) In a more specific example, computer 120 may provide for switching on/off or otherwise adjusting an alignment detection/correction mechanism, adjusting other control parameters provided by scanner 110 or for initiating re-scanning using scanner 110.)

Each of the above embodiments may utilize one or more evaluation processing operations to evaluate the data from one or more extraction processing operations. In addition, each of the above embodiments may utilize one or more derived data extraction processing operations to convert extracted data to more useful information or "derived data" (e.g., multimedia data that is representative of or represented by a content of a student response portion). If one or more extraction processing operations are used, each of the above embodiments may also utilize one or more derived data extraction processing operations to determine corresponding derived data, and may use one or more evaluation processing operations to evaluate derived data corresponding to the one or more extraction processing operations.

Figure 2:
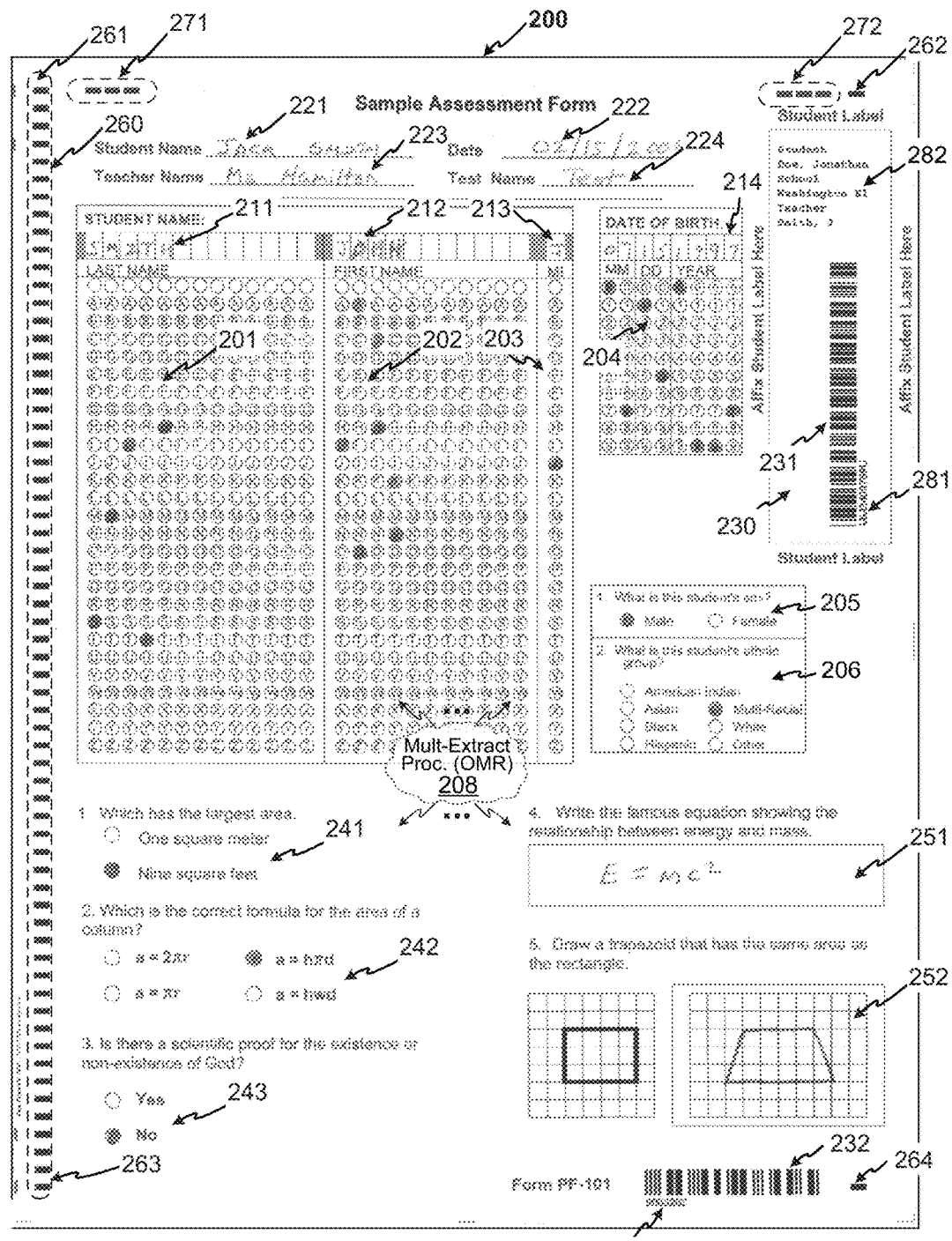
FIG. 2 illustrates a representative assessment document such as may be processed by embodiments of the invention.

FIG. 2 with further reference to FIGS. 1 and 3 through 5*f* illustrates how greater accuracy or trustworthiness may be achieved by using multiple extraction processing to extract, derive or evaluate one or more actual or potential pre-affixed or affix-able marks of an exemplary target document, here an assessment form 200. (Target document 200 may correspond with document 200' of FIG. 1.)

In the illustrated example, multiple extraction processing may include analyzing responsive or non-responsive marks affixed to a target document. Multiple extraction processing may also include analyzing pre-printed alignment or other document process facilitating marks affixed to a target document or marks affixed to a target document that may be directed at or serve purposes other than mark extraction facilitation but may also be used for multiple extraction processing according to embodiments of the invention ("non-extraction marks"). Multiple extraction processing may also include analyzing further information that may not be affixed to a target document but may be (i.e., or otherwise become), accessible to and received and processed by an extraction processor or "external information". (As was noted earlier, such analysis may, for example, include one or more of extraction, derivation and evaluation processing.)

As shown in FIG. 2, assessment form 200 components include exemplary identification fields 201-206, 211-213 and 205-206 for receiving student demographic information suitable for multiple extraction processing. For each of the first four such fields 201-204 in this example, there is also a separate entry area including fields 211-214 in which substantially the same demographic information may instead be affixed as text, as well as further repetitive or otherwise related open response fields 251-252 and label receiving area 230 that may be conditionally or non-conditionally extracted/evaluated alone or in combination by various multiple extraction processor embodiments.

The pre-printed grid included with response area 252, pre-printed lines/boxes, other presented or subliminal markings (e.g., a substantially unseen or otherwise little or unperceived visual or other multimedia grid), and so on may also be individually or collectively extracted/evaluated by one or more multiple extraction processors performing multiple extraction processing ("MEP"). External related information that may also be extracted, resolved or evaluated in conjunction with multiple extraction processing may include but is not limited to institution/admission lists, prior assessment or other (student) user samples, biometrics, ID-badges, other prior student, institution or administration information, and so on, or some combination of such "learning" information. Actual or predicted same or different student scores or other performance-based evaluation corresponding to same or different items or item types may also be similarly conditionally or non-conditionally evaluated to determine a mark location, intent, confidence, discrepancy, and so on, according to which mark resolution may be achieved or OMR or other additional extraction processing may be conducted, among other combinable examples. (It will be appreciated that other applications may similarly utilize related external information, the evaluation of which may facilitate more accurate or trustworthy multiple extraction processing results. Thus, for example, evaluation reports, ID, biometrics, affiliation, tendency, known or determinable demographics, prior user or responsive user interaction records, and so on, among numerous other combinable examples of MEP-facilitating external information, may be used in accordance with the requirements of a particular implementation.)

In the present example, entry areas 201-204 are divided into separate columns of text-indicating response bubbles which are suitable for multiple extraction processing that may include one or more OMR techniques. Entry areas 211-214 are further divided into separate boxes with each field corresponding to a single set of OMR target locations and each box corresponding to a respective one of the response bubble columns, and which boxes are suitable for OMR and/or OCR in conjunction with multiple extraction processing. (The boxes, any cross-outs, circling, check/edit marks, and so on are typically more susceptible to MEP using OMR while handwritten text or other characters are typically more susceptible to MEP using OCR.) Identification fields 221-224 provide open response fields and contrastingly provide for non-segmented mark entry, which is more suitable for processing by MEP using OCR or other handwriting recognition processing. Student label field 230 receives a student label, portions of which are more suitable for MEP using barcode processing techniques (231) or MEP using OCR (281, 282). Demographic fields 205-206, which are exemplary of survey items and include response bubbles, are suitable for processing by MEP using OMR. Other extraction processing techniques or some combination of techniques may also be used in conjunction with one or more MEP instances.

Assessment form 200 components also include exemplary items including SR items 241-243 and CR items 251-252 (which may also be referred to herein as "constrained" by the cell of an item or otherwise, and may also be referred to herein as "CCR" items). SR item fields 241-243 include selectable response bubbles for which a student may be directed to respond, in a responsive manner, by shading in one or more bubbles, and which responses are suitable for processing by MEP using OMR. CR item fields 251-252 comprise open-response fields that are suitable to hold constructed responses. A student may create such responses and affix them to document 200 by drawing, writing, affixing one or more "stickers" or "icons" within the field such that the set of affixed stickers constitutes a response, and so on, or some combination. The SR item fields/responses corresponding thereto are suitable for MEP using OMR, while various CR item fields may be suitable for MEP using OMR, OCR, OIR, audio/visual processing, and so on. (It will be appreciated that the particular mechanical, software, hardware or other manner of creating a CR item response portion, the content of that portion, and so on, may vary greatly in accordance with a given document portion, and that corresponding multiple extraction processors may determine and utilize one or more corresponding extraction processing techniques according to applicable criteria. Criteria, boundaries, constraints, rules, and so on are also referred to herein more generally as "business rules".)

Illustrated assessment form components also include exemplary pre-printed alignment and other indicia 260-264 including marks which may be known and/or extracted or evaluated in accordance with MEP to determine the location, extent, and/or orientation of areas of the target document that may contain marks and/or the location, extent, and/or orientation of specific portions of the document. Form 200 further includes exemplary marks to identify the document 271-272 that are suitable for MEP using OMR. (As noted earlier, particularly preprinted non-alignment marks affixed to document 200 may also be known/extracted and used to identify location, orientation, extent, and so on, of potential marks in conjunction with MEP; the preprinted grid of CR item 252, for example, while having a primary purpose in facilitating a response, may also be so used in conjunction with multiple extraction processing (e.g., see below).

Other fields, field types, field characteristics, or other assessment form components may also be processed using MEP, for example, as with the above fields or corresponding marks. Markings for various fields or field types may vary. For example, some fields or other document portions are designed to be filled in by a human user, which user may include a student, teacher, aide, administration official and so on prior to, during or after administration, in accordance with the requirements of a particular implementation. Additional fields may be placed on the assessment document by mechanical means prior to the test administration and may be created during the initial manufacturing or printing or subsequent to the printing. Still others, such as the barcode field on student label 230, are a hybrid in that the field is currently created by mechanical means (e.g., a laser printer), but then the mechanically printed component may be affixed to a target document by a human user.

In the above target document example, all of the fields that are designed to receive human responsive marks are appropriately identified and designated. For example, OMR response locations are typically identified or described so that the student may understand the intended meaning of making a corresponding responsive mark, and are typically designated by a circle, box, or other "target" indication indicating the area in which a mark should be made to indicate the students intention of selecting that option. For example, for each possible response to an SR item, the location of the response position is clearly marked with a circle and the meaning is clearly shown, such as "a=hπd". As another example, within the demographic fields, each column is identified with a banner description above such as "LAST NAME" and each response position within the column is further identified with a letter, digit, or other character, and designated with a surrounding circle. (Such identifying, describing, instructing, presumed common sense, and so on are also referred to herein interchangeably as "directing" or "designating" such that, for example, a student may "be directed" in such a manner as to produce a "responsive" mark or other response.)

As another example of identifying and designating fields, the response boxes above the demographic OMR columns (e.g., 211), are designed to hold a single text character such as a letter, digit, or special character. In the current example, the expected response within the boxes above the name fields are letters, while the expected response within the boxes above the date of birth fields are digits. Such response boxes are designated with the appropriate field name such as "LAST NAME" and are typically individually bounded by a rectangle or circle so that the respondent will fill in a single character for each corresponding to the sequential character in the field. Such response boxes may also be used independently of OMR, and as will be discussed, MEP may be configured to process expected/unexpected marks in a conditional or non-conditional manner in same or different MEP instances (e.g., first using OCR or other processing corresponding to text where text is expected and then using other OCR, OMR or other processing corresponding to a number, symbol, cross-out or one or more other potential marks; first using OMR to determine whether a box is blank, and so on, or some combination).

In general, particular fields may also be identified and designated for receiving one or more marks (i.e., or marks having particular characteristics) and the characteristics of appropriate identification and designation may vary according to the design of the document, the type of field, the sophistication of the respondent and/or other factors. However, such identification and/or designation is not required, such as with the fields at the top of the exemplary form to identify the form 271, 272, which are neither identified nor designated with bounding or other indicators.

Extracted and Derived OMR Data:

With OMR, each individual response position or target in which a student or other person ("target document user") may make a mark, represented here by a response border, represents a separate location from which a single OMR data extraction value may be extracted. The extracted data for each OMR response position or target is typically represented by a single number representing the extent to which there appears to be a (sufficiently) complete mark entered at the target location, often with a value of 0 to indicate the absence of any mark and the value of 15 to indicate a completely black mark over the target area. In addition to the extracted data, the data extraction processing may provide a confidence indicator ("extraction confidence indicator") for each data value.

(Note, however, that various below-discussed embodiments enable a degree of deviation from strict localization, mark type or other response characteristics. Thus, for example, student use of circling or other "proximate" mark placement or non-responsive marks may nevertheless be conditionally or non-conditionally extracted, derived, evaluated and/or documented, and/or may be conditionally or non-conditionally used for extraction processing evaluation, primary or secondary scoring, instruction following/infirmity analysis, "what if" and/or other performance-related evaluation, further extraction, and so on, or some combination, and may further be subject to resource allocation criteria. The criteria may also be directly or indirectly related to multiple extraction processing or "direct" or "indirect," among other combinable alternatives, for example, including non-responsive mark/type, discrepancy/type, resource availability, utilization, type or skill level, production deadline or other scheduling, document administration considerations, legal issues, and so on.)

Sets of such OMR targets are typically utilized to identify a single derived data element. For example, in the case of the "Middle Initial" field 203, each response position in the column of OMR target positions represents a single character. A second example is the case of the "Date of Birth" 204, which includes eight separate sets of OMR targets arranged in eight columns such that the set of response positions in each column corresponds to a single digit character, 0 through 9. In the case of the "Gender" field 205, there are two target fields horizontally arrayed. The first may correspond to a derived character of "M" while the second may correspond to a derived character of "F". A "derived data extraction processing" is used to convert each set of extracted OMR values to a derived data value, typically a character representing a letter or digit with special character codes used to indicate the absence of any mark within the set and another special character code used to indicate the presence of two or more apparent marks such that a single intended response to the set may not be determined. In the case in which the OMR extraction occurs within the scanner, the derived data may also be determined within the scanner. In addition to the derived data, the derived data extraction processing may provide a confidence indicator for each data value. (Those skilled in the art will also appreciate that corresponding considerations may also be applicable to non-OMR techniques that may also be utilized, or in using OMR or other techniques in conjunction with lines, edit marks, CR response, cross-out or other marks or mark portions that may be considered non-descript or otherwise undefined without reference to further information or derivation. OMR or other technique-based solutions discussed in conjunction with MEP may therefore apply in a similar or corresponding manner in such cases.)

Figures 4A, 4B:
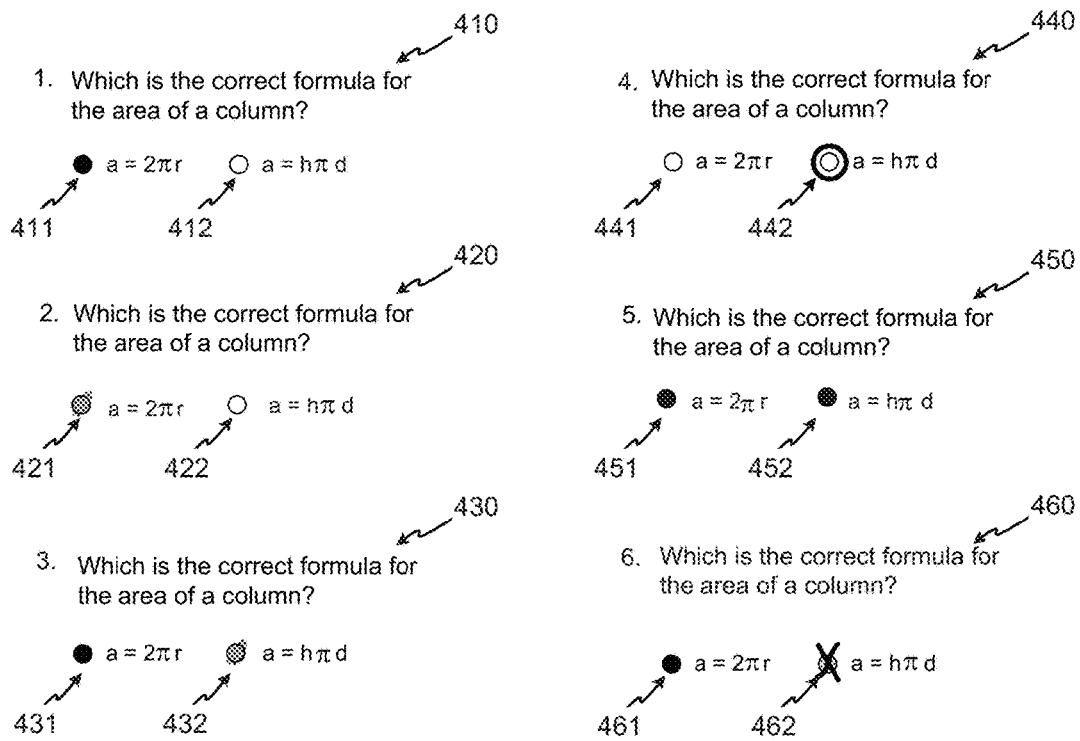
FIG. 4A illustrates multiple exemplary variations of student responses to an item of a target assessment document, according to an embodiment of the invention.
FIG. 4B is a chart illustrating exemplary extracted OMR values and corresponding derived data from those values, according to an embodiment of the invention.

FIGS. 4a and 4b illustrate a relationship between extracted and derived OMR data for a set of six SR items. In each of items 410-460 of FIG. 4a, there are two identified OMR response targets 411-412, 421-422, 431-432, 441-442, 451-452, 461-462. In this example, we presume that a student has been directed to fill in only one of the two response positions, but may instead respond in a different manner that in some cases, using conventional extraction, may be necessarily rejected as indeterminate. Such responses may, however, be extracted and may nevertheless be utilized for collection, scoring or other response evaluation, and so on in conjunction with various MEP embodiments.

A student may, for example, fill in one with a mark much darker or complete than the other to indicate the chosen or "intended" response. For each of items 1 through 3 (410-430), the intent of the respondent is clear as intending to select the first response for each.

For items 4 through 6 (440-460), however, the responding user intent is less clear. For item 4 (440), neither response is completed as directed (or "responsive") so that it may appear to be a "non-responsive" response, but the circle around the second target may be evaluated as indicating that the student intended to choose the second response. For item 5 (450), there are two marks of approximately the same value. Thus, because a single student mark is directed as being responsive, the intended response may be evaluated as unresponsive. However, the difference or some other information may be evaluated as sufficiently indicating (with sufficient confidence or otherwise according to evaluation criteria) that a student intended to select only one mark, or the more than one response may become acceptable (e.g., via accommodation of determined common student error or other result-based modification, or otherwise). For item 6 (460), the first response position has a complete dark mark, but the dark "X" over the second response position may be evaluated as indicating an incorrect (or apparently finally "unintended") first selection of the second response, an emphasis of the second selection as an intended response, and so on.

(The particular evaluation of a mark may vary in accordance with one or more of particular MEP implementations, goals, and so on. Evaluation processing may, for example, be determined or conducted in a fixed manner or according to applicable business rules, or more specifically, "evaluation criteria". Such criteria may provide for conducting static and/or dynamically variable evaluation of all or particular marks, mark types, student groups, scoring, other performance-evaluation or other uses of marks, and so on, or some combination. Evaluation criteria may also correspond with one or more of resource utilization, tabulation, reporting, intermediate/final delivery or other goals for utilization of one or more multiple extraction processing results, among still further examples.)

FIG. 4b illustrates an MEP result table 470 which shows, for each of the corresponding FIG. 4a mark examples, exemplary data values resulting from an OMR extraction that extracts marks within prescribed respective target areas and converts the marks to a 0 to 15 scale. Table 470 also illustrates exemplary derived data values resulting instead from a derived data extraction process using typical extraction criteria based on the darkness of the marks within a confidence indicator range for each derived value. A hyphen ("-") is used to designate an omitted item or non-response item, and an asterisk ("*") is used to designate an item response that includes two or more marks such that no one mark may be selected as the intended mark. The table also shows exemplary (derived) confidence indicators from the derived data extraction processing.

As shown in table 470, a traditional OMR processing will fail to identify potentially intended responses in items 4 and item 5, and will instead identify each case as a non-response. However, these (potentially) intended marks may be more accurately extracted, derived and evaluated in accordance with multiple extraction processing. Moreover, the manner in which such extraction, derivation and/or evaluation may be conducted, if at all, may be determined in accordance with general or particularized business rules, which rules may be specified according to one or more of particular authorization, administration, student groups, document uses, resource utilization, (potential) mark characteristics, individual or comparative item characteristics, performance evaluation, and so on (e.g., as was already discussed and is further discussed below).

Figures 3B, 4C:
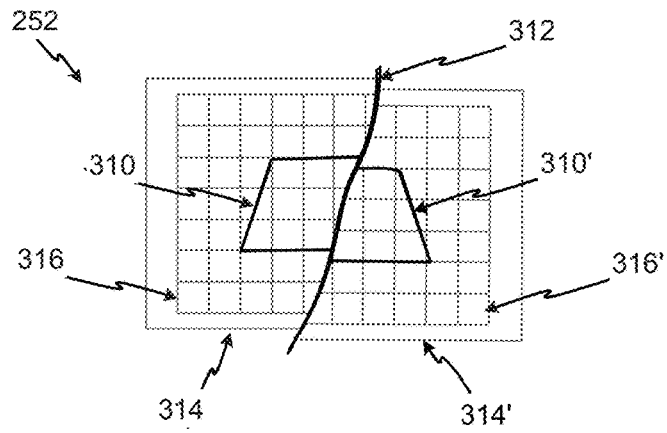
FIG. 3B illustrates an example of how embodiments of the invention may utilize known target document features or deformation of such features to locate, accommodate or otherwise process corresponding user marks.
FIG. 4C illustrates examples of exceptional mark processing that may utilize MEP, according to an embodiment of the invention

FIG. 4c further illustrates how the types or manners of providing marks as well as the business rules, particular techniques, utilization of resources/mark extractions, and so on may vary considerably in accordance with a particular implementation, and those specifically noted herein are intended only as examples. Items 7 through 10 (470a-480b), for example, include primary marks (e.g., darkened bubbles) as well as further secondary marks that, as with items 440, 460 of FIG. 4a, may be evaluated in order to resolve ambiguity in the inclusion or exclusion of primary marks or otherwise provide further indicators of user intent.

For example, items 7 and 8 include two of numerous secondary exceptional mark examples that be evaluated as indicative of an unintended response (e.g., cross-out and strike out), while items 9 and 10 include two of various examples of such marks that may be evaluated as indicative of an intended response: overlapping and non-overlapping check marks. One or more of such marks or mark types may further be only conditionally processed according to direction (e.g., "you may circle or check a selection, or cross out a fill-in, circle or check mark"), business concerns (e.g., intermittent/final delivery of a score/performance evaluation portion), use (in scoring, performance evaluation of time spent, lost score, indecision, etc.), available resources, item or item type (e.g., only SR items, particular SR items, types of CR items, portions of CR responses), and so on. Likelihood of exceptional marks due to responsive mark configuration or otherwise may also be used, among other combinable examples. For example, an absence of a primary mark or presence of "extra" responsive/primary mark may also be evaluated in conjunction with MEP as indicative of the presence of an exceptional/secondary mark (e.g., as with FIG. 4a) and may, in one embodiment, invoke business rules for determining one or more of whether to "look for such mark", whether one or more secondary marks exists, the type(s) of such mark(s), the likely intent of such mark(s), when to conduct such processing, human/electronic resources to be used, and so on. Conditions for MEP, dedication of resources, further utilization of marks, and so on may also include conflicting indicated intent among responsive/primary or non-responsive/secondary marks, among other examples.

Extraction processing is not, however, limited to those response locations that are identified by a target such as the response circles in the exemplary document 200 of FIG. 2. As one example, OMR may be used to extract data from pre-printed marks on the page such as the page identification fields 271-272, the results of which may be used to identify the document type. OMR may also be used to determine the presence or absence of a field, such as the student label barcode field 231 as taught by Poor, U.S. Pat. No. 5,452,379, or presence or absence of field contents or content characteristics. Extraction processing may also be used to verify a document portion, document portion content, document portion condition/alteration at one or more times/events (e.g., following a prior extraction or by differentiation from other marks, among other combinable examples.

Human Completed OMR Fields.

Looking first at all of the human completed fields suitable for processing by OMR, there are several embodiments that utilize multiple extraction of markings within OMR fields that are completed by a person, typically a student, test taker, or other responding user.

In one embodiment, these fields may be extracted from a portion of a document scanned once but processed by at least two extraction processing techniques to yield two sets of OMR values for each field: one from the first extraction and one from the second. These two sets of values may be subjected to evaluation processing in which, for each possible OMR response position within the field, the resultant value and/or confidence indicator(s) from the first extraction is compared to the resultant value and/or confidence indicator(s) from the second extraction. If there are discrepancies, then the field may be subjected to additional processing. Additional extraction processing instances may also be used. (Note that, for clarity sake, targets at which a responsive mark, i.e., or other response, may be located but are not subject to OMR may also be referred to herein as "OMR response positions"; thus, for example, where a target mark may be extracted using OMR and evaluated against another mark that may utilize OCR, stroke/motion analysis, biometric information or some other technique, both "marks" may nevertheless be referred to—as in the more typical case—as corresponding to "OMR" response positions, portions, fields or locations.)

In a second embodiment based on human completed fields suitable for processing by OMR, in all instances in which there are one or more sets of mutually exclusive response options, such as for each column of a demographic field, the SR items and the survey type items, evaluation processing based on derived data may be used to selectively invoke a second (or other further) extraction process. In such cases, following a first extraction processing, a derived data extraction processing analyzes the extracted OMR data and/or confidence indicators for each response position within such a mutually exclusive set to determine whether there is a single response, no response, or multiple responses, and to identify the single response if appropriate. The derived data extraction processing may also produce a derived confidence indicator corresponding to an extracted data value.

Based on appropriate business rules, an evaluation processing may utilize the results from the single derived data extraction processing to determine whether a second extraction is needed. For example, within a demographic field, each set of extracted OMR data corresponding to the letters or numbers in that column may be converted to a single character to represent the one selected number or letter, to represent that there was no selected number or letter, or to represent that there were two or more marks such that a single mark could not confidently be selected as the intended response. (See, for example, layer 715 of FIG. 7b). An evaluation processing then examines the resulting derived data and the confidence indicator. If the result is determined to be untrustworthy, then a second (or other further) OMR extraction processing instance(s) may be performed on the same fields.

In a third embodiment based on the same restriction of human completed fields with one or more sets of mutually exclusive responses, multiple OMR extraction processing is first performed on all OMR response areas as was described in the first embodiment. For each set of mutually exclusive responses, then, derived data are calculated for both the first extraction and the second extraction such that there are derived data values for each mutually exclusive set indicating the selected response, no response, or more than one response and may also provide a confidence indicator. Evaluation processing is then performed that compares each derived data value from the first and second data extractions. If the derived data are discrepant, or if neither of the extractions or the combined extractions are sufficient to meet the confidence requirements ("confidence criteria"), then additional extraction processing may be conditionally or non-conditionally performed. (In another embodiment, further processing may be conducted according to one or more of the substantiality, type(s) or other characteristic(s) of a discrepancy, which characteristics or responses thereto may be statically or dynamically prescribed.)

Another example of multiple extraction processing based on the same restriction of human completed fields with one or more sets of mutually exclusive responses may be used in the special case in which there is a box or other entry area associated with each mutually exclusive set of OMR response positions, such as in the name and date of birth fields. In such cases, one or more extraction processing instances may be based on extracting the OMR values and then determining the derived data for each set. In the current examples, therefore, there will be a single character of derived data corresponding to each column of OMR positions. The second extraction processing utilizes the captured image of the portion of the document containing the box or other entry area and utilizes Intelligent Character Recognition (ICR) to recognize any handwritten character associated with that portion.

The two extractions may be always done, or one extraction may comprise a primary technique with the other may be performed when an evaluation process finds that the data from the first extraction is not trustworthy, or further, applicable business rules do not prevent or otherwise "provide for" conducting the other extraction. (It will be appreciated in this or other embodiments that, where more than two extractions may be conducted, each extraction may be conducted in a static manner or subject to some prioritization or other determination mechanism that may further determine the technique or techniques to apply, the scheduling, the resource(s) to be used, or other criteria for corresponding extraction, derivation, evaluation or some combination.)

The evaluation process to determine whether the first extraction is trustworthy may be conducted on each mutually exclusive set, such as looking for a single response or no response within the set, may include confidence indicators, and/or may look at the entire field such as flagging a field as untrustworthy if there are embedded blanks surrounded by resolved characters. Once both extractions (i.e., or applicable extractions) are done and the derived data have been computed from the OMR, an evaluation processing may compare the extracted ICR values for each response area corresponding to a set of OMR positions to the derived character or other value for that set. The evaluation engine may also include confidence indicators ("evaluation confidence indicators") and/or may look at the entire field and apply business rules to the field as well as the individual positions or columns within the field.

Barcode Fields:

Other embodiments of multiple extraction processing may be performed on barcodes, e.g., 231, 232 of FIG. 2) utilizing OMR.

A first embodiment of barcode processing may, for example, provide for causing a hardware-based barcode reader to read a subject barcode as a first extraction processing, the extraction result for which may comprise the barcode reader output. The embodiment also includes scanning the barcode to produce captured data corresponding thereto and extracting the barcode information from the captured data, e.g., as was already discussed for OMR. As with the above-discussed OMR embodiments, this first embodiment may perform both extractions and then use an evaluation processing based on comparing the resultant extracted data and/or confidence indicators from both extractions. As with OMR, in a second embodiment one of these extraction techniques may be always performed and the second extraction processing used only when the first extraction provides data that an evaluation processing deems untrustworthy or sufficiently untrustworthy. (As with other various extraction combinations, a reversed ordering or concurrent processing may also be used in accordance with the requirements of a particular implementation.)

Similar to OMR fields with associated areas to hold handwritten characters, special case embodiments may be employed when there is a typed or otherwise printed series of digits, letters, and/or other characters to represent contents coded within the barcode such as 281-282 (FIG. 2). In such special instances, the multiple extraction processing includes at least one processing to read or "decode" the barcode and a second extraction processing to process the captured image of the document containing at least the portion in which the printed character representation is printed. This second extraction process may further implement one or more OCR techniques to convert the printed characters to data. In one embodiment, one extraction is first performed and the second is performed only when an appropriate evaluation processing determines that the extracted data are untrustworthy, i.e., or sufficiently untrustworthy. (More generally stated, at least one successive instance may be conditionally executed according to the results of at least one prior instance.) In another embodiment, both extractions are performed and the evaluation processing compares the two resulting sets of extracted data with or without associated confidence indicators.

In some embodiments, the criteria used by the evaluation processing may be dynamically modified according to the characteristics of marks within a portion of the document ("mark characteristics"), the results of extracted data ("extracted data results") and/or based on results of derived data ("derived data results"). For example, in document 200 (FIG. 2), if barcode 231 that is printed on the student barcode label 230 is valid, then the student may be positively identified and there may be no need to conduct extraction processing (or rely on prior conducted such processing) on the OMR marks in the student name field or the blocks of characters written above the name field. In such an instance, evaluation processing for the OMR name fields or the corresponding blocks, if any, may be adjusted to ignore or downgrade (e.g., via weighting, confidence indicator modification or other mechanism) any discrepancies, untrustworthy data, or other conditions that may otherwise result in a determination that additional extraction processing or other processing should be conducted.

Constructed Response Fields:

Typically, the extracted data for a constructed response field includes a portion of a captured image corresponding to a CR response field. The extraction processing may save a captured image of the entire page of the assessment document or a subset thereof, and the captured image may be subsequently analyzed and a corresponding score to the item produced (or other performance-based evaluation). Typically, a reader or other evaluator is presented with some portion of the captured image that includes the area in which the response was made, e.g., as shown by Poor, '060. Some CR items may, however, also or instead be automatically (e.g., programmatically) processed to extract additional data from the captured image and subsequently assign a "score" to the item that corresponds to the extracted data. Extraction processing that may be conducted in such a case may, for example, include ICR, image analysis, or other extraction processing of the portion of a captured image that includes the CR item. The assignment of a score, whether by a person, automated process, or combination thereof, may be conducted in accordance with derived data extraction processing as discussed herein.

In some instances, the captured image including the CR item response may also be examined by a blank determination process to determine the presence or absence of marks prior to displaying the image to a reader. The blank determination process may include OMR such as taught by Poor, '616, or may utilize some other form of image analysis. If, for example, a multiple extraction engine conducts a blank determination process that classifies the area as blank or non-responsive, then the engine may avoid sending the image to an evaluator, flag the result as correspondingly blank or non-responsive, and so on, or some combination. However, in conjunction with determining a blank or non-responsive derived data classification, an automated or human evaluator may also determine that an additional extraction process should be conducted (e.g., to account for the possibility of an incomplete or inaccurate captured image), and may initiate or conduct at least a portion of such additional extraction processing.

In a similar manner, in some instances, the automated or human process may not adequately assign a score because the image is unclear or otherwise distorted so as to not be suitable for processing. This is an especially vexing issue when the captured image is a bitonal image in which it is sometimes extremely difficult if not impossible to differentiate between a smudge or light mark from a dark mark without also evaluating further corresponding information. In such cases, process may determine that additional extraction processing should be conducted which may include image enhancement processing on the captured image, rescanning the document and capturing a new image or having the reviewer effectively become the extraction processing in conjunction with reviewing at the original document.

Within the field of assigning scores to CR items by readers, it is known that if the score assigned by a reader fails to meet some specified criteria, or if there are two or more scores for the same item that are deemed to be discrepant, the item being scored is sent for review by a supervisor, sent to an additional reader, or otherwise flagged for additional processing. Unfortunately, such review is currently essentially linear (process in a common manner and then review), particularly automated processing is currently highly limited (e.g., capturing of CR items) and there is little to ensure optimal processing or review.

Embodiments of this invention, however, also provide for determining whether additional extraction processing should be conducted, and if so, for conducting such processing. Processing may further include but is not limited to one or more of determining corresponding target document or external data, which data may be the same or different from the target data that was initially processed, determining a corresponding extraction technique or techniques, determining/conducting resource allocation corresponding to the determined processing, conducting such extracting, determining/conducting the creation of derived data, performing/initiating evaluation, conducting processing/result notification or documentation, and so on. Embodiments may further do so in same or different manners that may further be objectively implemented, particularized or adaptable (e.g., via conditions, business rules or other mechanisms), and may conform with or even contradict human processing that is or may otherwise be conducted.

Thus, for example, an extraction processing engine may conduct initial extraction processing of a target item response that indicates high confidence such that the resulting item data may be allocated (e.g., by the below discussed resource allocation engine) for accurately specifiable automated or human scoring or other performance evaluation. The response may further be responsive or non-responsive (in a conventional sense), and the scoring or performance evaluation may be primary (e.g., factored into a final score or other result as is conventionally done) or secondary (e.g., informational or useable for reporting or some other purpose or purposes, for example, as was already discussed). Assuming that the scoring or performance evaluation nevertheless indicates that an extraction error may have occurred or that effective resource allocation in this instance is determined to include processing of non-responsive responses or for secondary scoring/performance evaluation at a later time, among other potential determinations, such additional extraction processing may be conducted. (Scoring indications may, for example, include discrepant scores on a particular SR or CR item, related SR items or related CR items, related SR and CR items, a general or particular score portion corresponding to related SR and CR items, prior assessed and currently assessed items or other student or student group learning, and so on.) The additional processing may further be conducted in conjunction with the same or different target document or external data that may be or have been subsequently extracted, among other examples that should become apparent to those skilled in the art.

Constrained Constructed Response Fields:

As taught by Tidwell-Scheuring, U.S. Pat. Nos. 8,086,166 and 7,056,124, the processing of CR fields may be conducted on a portion of the captured image corresponding to the field. The extraction processing may save a captured image of the entire page of the assessment document or a subset thereof, and the captured image may be subsequently used to assign a "score" to the item through a derived data extraction processing which identifies and locates the set of "stickers" within the field and then converts the identification and location to one or more "scores" with or without confidence indicators.

As with CR items, a blank determination process may be conducted on the captured image to determine the presence or absence of marks prior to submitting the image to the CR data extraction processing, and submitting the image to the CR data extraction processing may be avoided for fields with no marks.

Following the extraction processing and/or the derived data extraction processing, an evaluation processing may be performed to determine the extent to which the derived data are trustworthy. CR items may be deemed untrustworthy because of unclear or distorted images, other distortions of the image, or the specific set of stickers used, the manner in which the stickers were affixed, and may also be deemed untrustworthy due to failures, exception conditions, anomalies, or other conditions within the extraction process.

If the field is deemed blank, or if the derived score is not deemed sufficiently trustworthy, the CCR field may be subjected to additional processing that may include enhanced extraction processing by image enhancement of the captured image, additional extraction processing by rescanning of the portion of the document containing the field, additional derived data extraction processing by submitting the item for scoring by a human reader, or other appropriate processes.

Registration Mark Fields:

Looking next at the pre-printed indicia, document 200 (FIG. 2) includes marks 260-264 that, as a general case, may be called "registration marks". In some extraction processing, such as those that utilize mechanical means to ensure that the document and response positions are properly aligned, the extraction processing may utilize only the marks within the so-called "timing track" subset of the registration marks, i.e. those on the guide edge 260. Such timing tracks are used to identify the vertical position of a line of OMR positions across the width of the document. In some instances, the timing marks may be missing, torn, overwritten, or otherwise made unreliable such as shown in the torn out section 301 of FIG. 3*a*, and such un-readability would normally make all extracted data from the form untrustworthy. Document 300, however illustrates how a second set of timing tracks 260' may be included on the assessment form in addition to the more conventional timing tracks 360 (hereinafter "primary" timing tracks).

One embodiment of the invention provides, when processing such a form, for conducting a first OMR extraction process ("first registration extraction process") on the form. The embodiment also provides for conducting an evaluation processing that compares the number of tracks identified in the first registration extraction process to the expected number of tracks. If the number of tracks extracted is different from the number of tracks expected, then the embodiment provides for conducting a second OMR extraction processing on the second set of timing tracks to locate the vertical positions of the OMR response positions.

In other embodiments, corner registration marks such as marks 261-264 of document 200 (FIG. 2) and 261, 262, 363, 364 of document 300 (FIG. 3*a*), or other marks may also be used to determine the location, extent, or orientation of an area within the document that may contain marks for extraction, or to determine the location, extent, and/or orientation of specific portions of the document. Such registration marks may be used conjunction with initial or subsequent extraction processing for instance, as shown in Poor, '616.

As with timing tracks, however, such registration marks may be torn off, distorted, partially missing, or otherwise unreliable. As shown in FIG. 3*a*, a second set of those registration marks most likely to be compromised 362' and 364' may be included on form 200 to allow positive registration of the form even though one or more of the primary registration marks 262, 364 may be compromised. When processing such a document, a first (OMR) extraction process may be performed on the form. The extraction processing may include determining the success and confidence in locating required registration marks. Evaluation processing may further be conducted to determine the trustworthiness of the registration marks. If the evaluation processing determines that the OMR values extracted from the first extraction processing are not trustworthy because of a registration mark or marks for which secondary marks exist, a second or further (OMR) extraction processing may be performed utilizing the second set of registration marks to determine the location, extent, and/or orientation of the area within the document that may contain marks for extraction, and/or determine the location, extent, and/or orientation of specific portions of the document. When using a document definition system such as the Predetermined Read Matrix definitions as taught by Poor, '616, multiple sets of OMR extraction processing may be performed on a single captured image of a document to achieve the most trustworthy OMR values possible.

In another embodiment, one or more other presented or fully or partially subliminal or otherwise not-presented marks may also be used to determine the location, extent, orientation or deformation a target document portion or of a response, if a response is provided. In this embodiment, the marks may also include one or more secondary registration marks; that is, one or more marks may comprise a presentation component of a target document.

FIG. 3*b*, for example, illustrates how one or more portions of the response area 252 of a CR item (item 5 shown in FIG. 2), while otherwise operating as a response area indicator, may also be utilized as secondary or "localized registration" marks in conjunction with performing extracting processing of a corresponding response. In one aspect, response area 252 portions (e.g., horizontal/vertical lines, vertices, etc.) are pre-affixed at known locations and orientations. Therefore, an extraction engine may find a student response as including a mark portion within the region. (In other cases, such as with CR item responses including paragraph editing, matching, labeling and so on, one or more response portions may also be located within super-regions about the response region, for example, as taught by Tidwell-Scheuring, U.S. Pat. Nos. 8,086,166 and 7,056,124. An extraction engine may further determine, from known characteristics of a responsive mark, sub-regions within region 252 in which portions of a student mark should be found if the student mark is substantially responsive. In another aspect, an extraction engine may further utilize known characteristics of the response region to determine deviations in student response that may nevertheless be permissible in a responsive mark.

For example, FIG. 3*b* illustrates how region 252 of a target document has been deformed by a tear, fold or other deformation 312. While an extraction engine may perform extraction processing to more directly detect traces of the deformation, such traces may be faint or the deformation may be otherwise difficult to detect in a direct manner. However, an extraction engine may also conduct extraction processing to detect the deformation or more specific deformation characteristics as corresponding to detectable deviation of the response area components from their known printed characteristics (or further localized deviation from other deviations in the document, e.g., using mechanisms such as those already discussed).

In the present example, evaluation processing may determine that region border portion 314' has been lowered and rotated with respect to border portion 314, as has grid portion 316' with respect to grid portion 316, or further, the extent of such deformation (e.g., by analyzing the location and orientation of components of such portions as compared with the printed characteristics). The extraction engine may therefore perform extraction or further processing (e.g., scoring) in conjunction with response portions 310 and 310' according to the detected deformation, for example, extracting or evaluating response portion 310' in accordance with the detected deformation.

(It will be appreciated that the response area may also provide a reference that is useable for locating or otherwise conducting extraction processing of other regions and that such detection may also provide a deformation indicator indicating potential deformation of other, typically proximate portions of the target document. Those skilled in the art will also appreciate that other presented or other indicia or some combination thereof may also be utilized in a similar manner for determining the above or other characteristics of a source document portion or allowable deviation or other corresponding characteristics of one or more student marks.)

Non-Responsive Marks:

Some embodiments of the invention also provide for identifying or further processing unusual or "exceptional" marks that may not be conventionally processed or may be conventionally mis-processed (e.g., mis-evaluated), that may not be utilized in conjunction with primary scoring, and so on. Exceptional marks may, for example, include that are provided by a student or other user, but that include a form or other characteristics that may deviate from explicit or implicit direction for a response ("non-responsive marks").

One such embodiment, for example, provides for conducting initial extraction processing for only those portions of the document that are identified as response areas. This may, for instance, include processing all OMR response positions looking for marks that are detectable by an OMR extraction process. While further extraction processing may be directly conducted for non-responsive marks, additional accuracy may be achieved where non-responsive marks may be expectable, an additional processing may first be applied to the captured image to remove, mask, or otherwise remove from a second extraction processing, those markings that correspond to marks extracted by a prior OMR extraction process. A second (or other further) extraction process, then, may examine at least some remaining portions of the document not already subjected to OMR extraction in the first extraction processing, to identify any additional markings.

FIGS. 5a through 5d illustrate how multiple extraction processing may be applied to various non-responsive or other marks. For clarity sake, each of sub-FIGS. 5a through 5f depicts the same SR item 510, 520, 530, 540, 550, 560, with the same two possible OMR response areas for each 511(a) through 511(f) and 512(a) through 512(f).

Figure 5A:
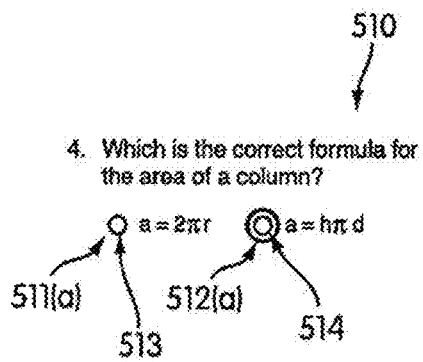
FIG. 5A illustrates another example of exceptional mark processing that may utilize MEP, according to an embodiment of the invention.

In FIG. 5a, a non-exceptional OMR extraction processing is conducted with response areas 513, 514, corresponding to the designated OMR area. As shown above, such an extraction processing will result in a derived extraction processing result of a blank or non-response. FIGS. 5b and 5c show response areas suitable for extraction processing in expanded areas to cover intended responses that are non-responsive in that they do not conform to the marking instructions and are outside the designated target areas. If the first extraction processing based on the response areas shown in FIG. 5a, specifically 513 and 514, results in an apparent non-response, a second (or further) extraction processing corresponding to the response areas shown in 5b, specifically 523 and 524, may be used to properly identify an intended mark such as shown surrounding the second response designated target. If the processing for the SAT® had included a similar second extraction processing for the apparent blank items, the error may have been avoided. FIG. 5c shows another set of possible response areas 533 and 534 that may be used with an additional extraction processing, for example, in conjunction with ballot applications in which voters may be expected to circle candidate names.

As noted above, an extraction processing based on such extended response areas as shown in FIGS. 5b and 5c may be conditionally or non-conditionally utilized. For example, extraction processing may be conducted as "additional" extraction processing (instances) that may be conducted only after a prior extraction processing and an appropriate evaluation of either the extracted data or of derived data indicating a blank response, low confidence, or otherwise exceptional condition. As also shown above, such an extraction processing based on such extended response areas as shown in FIGS. 5b and 5c may be also be always performed with subsequent appropriate evaluation processing utilizing extracted data and/or derived data from one or more extractions, among other examples.

Figure 5D:
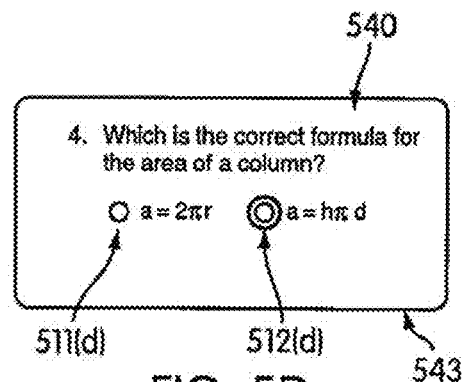
FIG. 5D illustrates another example of exceptional mark processing that may utilize MEP, according to an embodiment of the invention.
Figure 5B:
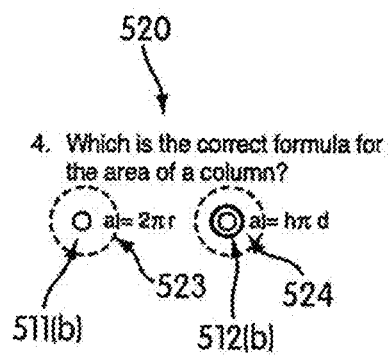
FIG. 5B illustrates another example of exceptional mark processing that may utilize MEP, according to an embodiment of the invention.
Figure 5E:
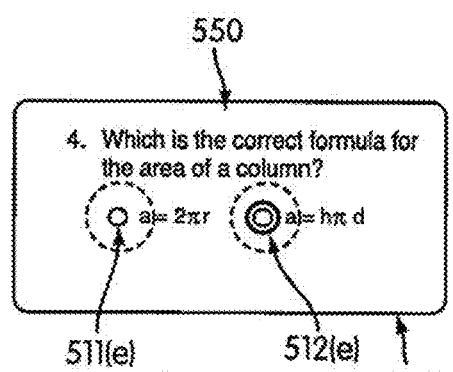
FIG. 5E illustrates another example of exceptional mark processing that may utilize MEP, according to an embodiment of the invention.
Figure 5C:
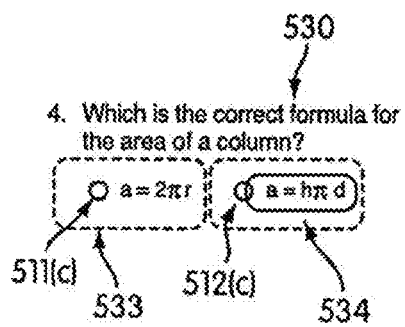
FIG. 5C illustrates another example of exceptional mark processing that may utilize MEP, according to an embodiment of the invention.
Figure 5F:
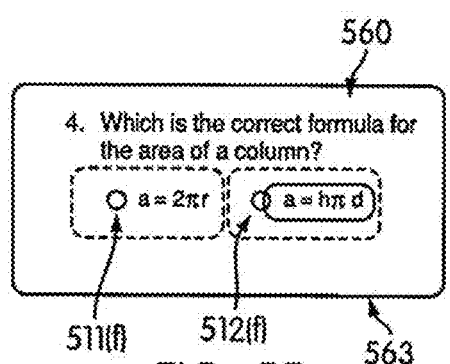
FIG. 5F illustrates another example of exceptional mark processing that may utilize MEP, according to an embodiment of the invention.

Once an apparently trustworthy response has been identified using one or more extraction processing (including evaluation processing) using extracted and/or derived data, or when no apparent intended response is identified using any appropriate extraction processing, an additional extraction processing may be performed to look within a larger portion of the document to identify potential exceptions such as those shown in FIGS. 5d through 5f. In each of these, a larger area is defined that excludes prior response areas and extraction processing is performed only on the larger area 543, 553, 563.

It will be appreciated, however, that evaluation of external or other non mark data or non-target data, applying data masking, utilizing a super or otherwise modified extraction region, use of directed, optimized or other target-type specific extraction approach or other different extraction processing techniques may be determined for use, scheduled or conducted as part of an initial or subsequent extraction processing instance. Such application, scheduling or conducting may also be determined according to a wide variety of time/event conditions that are not limited to those noted above.

For example, all or particular exceptional mark processing may be conditioned on the usefulness of such data in a particular instance. Such usefulness may, for example, be determined according to whether resulting extracted data will be considered in primary scoring or other performance evaluation (e.g., counted, given full/partial credit, and so on), secondary or other subsequent scoring (e.g., score modification for borderline, re-scoring or other exceptional conditions), secondary evaluation (e.g., potential score if compliant, indicative of some physical/psychological condition or tendency, etc.), processed/stored for statistical or other use, and so on, to name just a few.

Exceptional mark or other extraction processing may also be conditioned according to a wide variety of other "scheduling" or "resource allocation" criteria. For example, in a particular case, standards or other business rules direct that primary scoring excludes one or more (e.g., all) types of non-responsive or other exceptional marks. While such marks may otherwise be useful, the scheduling or resources applicable to processing such marks may nevertheless be conditional. For example, further early delivery or limited resource availability criteria may generate a condition in which such exceptional marks, if processed, may be processed only after such criteria are satisfied, e.g., on-time delivery of responsive mark processing is expected/assured, "extra" resources are available (e.g., time, processing, storage or throughput slices are determined to be not-needed for responsive marks or are otherwise available), and so on.

Dynamic conditions may also be utilized in conjunction with extraction processing. For example, exceptional or other mark processing may be processed according to a lower priority or other condition unless the results such processing, student history or other conditions indicate that such marks are significant (e.g., a specific voter, voters or other "students" or "student groups" circle all intended responses or create a same or similar CR error, tend to circle intended responses or create a same or similar CR error, and so on. Re-scoring, evaluator training, performance evaluation, application of scoring results (e.g., see below), coordination with expectation checking, other scoring/evaluating, subsequent item generating/presenting or other processing, usefulness modification, addition/removal of available resources, preliminary result or other reporting, re-scheduling or other conditions may also be implemented in a dynamic manner or cause other criteria to be dynamically modified. Other examples of conditional processing or combinations thereof that may be applicable to one or more extraction processing instances will also become apparent to those skilled in the art.

It should also now be apparent that there are multiple types of extraction processing that may be advantageously used in embodiments of the invention. Some such extraction processing include extraction processing to capture OMR data, extraction processing to capture barcode data, extraction processing to capture an image of a portion of an assessment document, extraction processing to utilize OCR or ICR to convert captured electronic representation of marks to text. If the assessment data are collected by other means, additional extraction processing may be performed by voice recognition systems for audio, image analysis, or other techniques depending on the mode of responding to assessment items and the manner in which the student responses are stored.

In addition, there are multiple derived data extraction processing that may be used in embodiments of the invention including conversion of sets of OMR data to test or other field-level data, human keying of text from captured images, image analysis of captured images. Once text representations of verbal fields are available, derived data extraction processing may include semantic, grammatical, or other techniques. Derived data extraction processing may also include systems based on fuzzy logic, artificial intelligence (AI) techniques, pattern matching, and other techniques.

One class of derived data is that of "scores" that are assigned to items within an assessment or other target document. For SR items, a score may be produced by conducting a multiple-level process of derived data extraction, and often a two level process of derived data extraction may be conducted.

In the case of OMR data, extraction processing typically yields a set of discrete OMR values for each item. The first derived data extraction processing typically converts each set of discrete OMR values into a single character or number to represent the student's response to an item or to represent a non-response or multiple response to the item ("response indicator"). A second derived data extraction processing typically converts the response indicator to a correct/incorrect classification or to a numeric classification showing the full or partial credit given to the student for that item based on the representation of the student response. If the SR item data is derived from another assessment mode, a student responses may be converted into either of the derived data values as part of the extraction processing.

Figure 6A:
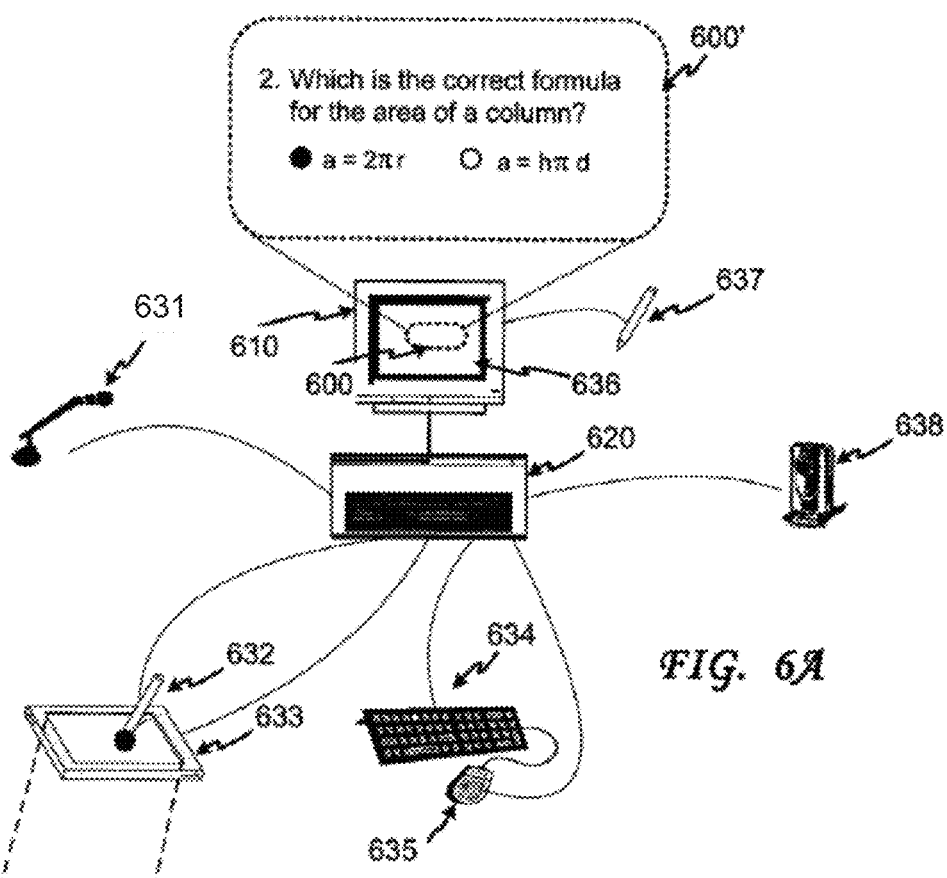
FIG. 6A illustrates an example of MEP processing in conjunction with one or more interactive or other electronic target documents, according to an embodiment of the invention.

FIG. 6a shows an assessment item 600, 600', as it may be presented on a computer screen 610, under control of a computer or workstation 620. As shown in FIG. 6, a respondent may indicate a response by using a microphone 631, digitizing pen associated with a digitizing pad 632, digitizing pad or tablet 633, keyboard 634, mouse 635, digital pen 637, camera 638, and so on. Other appropriate analog, digital, or multimedia recording devices or some combination may also be used.

Those skilled in the art will appreciate that while the accuracy of such electronic or "interactive systems" may be high, errors may nevertheless occur. For example, an association of an SR response area with a selected response action (e.g., clicking, stroking or tapping a mouse pen on or about a response or corresponding area, speaking, and so on to indicate a response) may nevertheless indicate an response other than that selected. A corresponding user action may, for example, be unintended, a presentation error may cause a predetermined action acquisition to acquire a response other than that selected, and so on. It will also be appreciated that these or other errors may also become more likely or exaggerated in conjunction with CR or other items, in which user responses may be more complex or more highly scrutinized (e.g., where the user may draw, act or utilize other or combined multimedia response portions). Moreover, it may well be desirable for an extraction system to provide clear generation, administration or other validation, in which case it may be just as important to prove user response, other administration or other occurrences or results thereof even where a response system reliability may be considered beyond question. Multiple extraction processing may also provide for collecting data that may otherwise be lost in a wholly result-directed extraction, such as in collecting step, sequence, stroke, biometrics or other interaction information pertaining to one or more target document users, among still further combinable examples. It will further become apparent that such processing may encompass, wholly electronic or interactive local/remote targets or some portion thereof, wholly hardcopy targets or some portion thereof, or some combination.

Thus, in one embodiment, a multiple extraction processor provides for non-conditionally or conditionally extracting a presentation portion corresponding to at least one of a portion of a presentation made to a user and one or more portions of a presentation made to a user that includes user interaction information. Extracting presentation information in one more specific embodiment includes extracting an entire presentation, for example, by conducting a screen capture and capturing at least temporarily stored information corresponding to that presentation (e.g., display memory data, display creation/response action collecting data, etc.). The MEP may also include collecting user-action related data (e.g., an indicator indicating a user selection, object insertion, and so on), and may include derived data processing and/or evaluation processing (e.g., comparing derived data with user-action related data or "user action data").

Figure 6B:
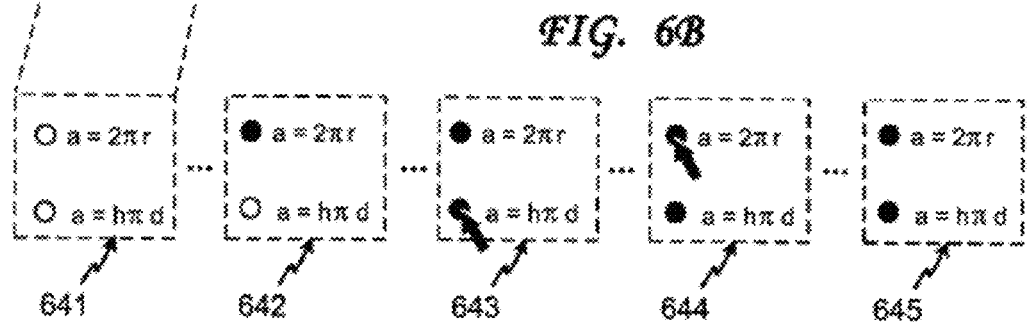
FIG. 6B illustrates another example of MEP processing in conjunction with one or more interactive or other electronic target documents, according to an embodiment of the invention.

As shown in FIG. 6b, for example, where a selection indicating assessment administration system does not provide for user editing but does provide an MEP (related) component for capturing MEP information, an MEP system may provide for (capturing and) conducting MEP processing of a screen portion including portion 645, e.g., extracting, deriving and evaluating portion 645 as compared with the action result. The MEP system may therefore validate that the user actually selected the indicated response selections (or not) by providing a "snapshot" of the properly placed selection or action indicating such selection (e.g., also showing a cursor). In conjunction with other administration/MEP systems in which multiple capturing and extracting or other MEP processing may be conducted, the MEP system may provide for avoiding non-responsive result 645, for example, according to business rules that may provide for determining intent generally or in such "extra selection" or other cases as a first selected response, last selected response, and so on. The MEP system may further determine that a discrepancy exists in that the editing system failed, which discrepancy resulted in the extra selection, or may further determine user intent or that the user entered two or more selections (from which a performance evaluations system may further determine confusion, time used, and so on relating to the user or also further users).

Figure 6C:
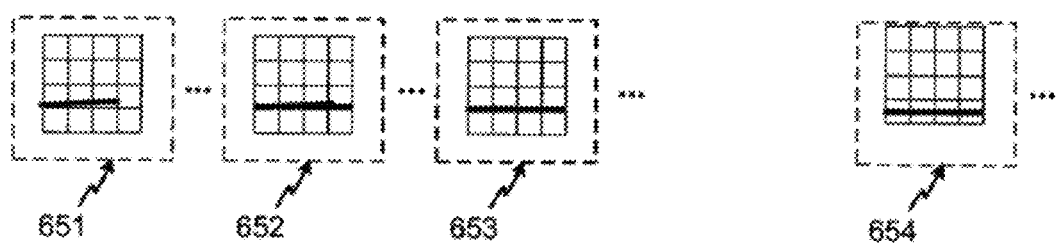
FIG. 6C illustrates another example of MEP processing in conjunction with one or more interactive or other electronic target documents, according to an embodiment of the invention.

The example of FIG. 6c further illustrates how a system embodiment that is similar to that of FIG. 6b may also provide for (capturing and) extracting or further MEP processing of user response (e.g., 653) versus action result 654. (The MEP system may, for example, compare the extracted response 653 with an action overlay 654). As a result, the MEP system may correctly determine that a discrepancy exists in that the image presented to a user or a user's response are not correctly reflected by an overlay of an action template and a user response, one or both of which have been transposed or otherwise corrupted. Moreover, such extraction or further MEP system processing of capture/responsive action portions 651-654 or user stroke, biometric or other information corresponding thereto, which may also be captured and so processed, may provide for determining partial user drawing (651), user correction (652), user cleanup correction through erasure of the slanted line (653) and so on, from which highly useful user performance evaluation or other non-scoring information may be determined, among other examples.

It should be noted, however, that such MEP processing of electronic documents is not limited to non-conditional processing of such documents or vice versa. Rather, the above extraction, derived data or evaluation processing may also be conducted in conjunction with hardcopy target documents, which processing may be used separately with such documents, producing results corresponding to a portion of such documents that may be scored or otherwise further processed in conjunction with one another or which MEP may be conducted on a combination of such portions (e.g., evaluating such portions together by comparing extractions, results, and so on, initiating further extraction instances according to one or more of such processing, and so on. Likewise, discussion herein of MEP in conjunction with hardcopy target documents may also be conducted in one or more of such manners with electronic target documents or other user interaction. Conditional processing may also be conducted in conjunction with such document portions, for example, including but not limited to allocating resources or conducting such extraction, derivation, evaluating, control or other MEP according to applicable business rules (e.g., at different times or using different resources for distributed processing, coordination, combined evaluation, training, scoring/performance evaluation, related items, intermediate/final delivery, types of these, and so on).

As will be apparent to one skilled in the art, some recording procedures will directly yield character or numeric representations of the student's response while others will require extraction processing and/or one or more derived data extraction processing. Once again, this description clearly delineates extraction processing from derived data extraction processing and evaluation processing while the three may be re ordered and/or combined in any number of embodiments.

Derived data extraction processing may also provide for a human to resolve untrustworthy, discrepant, or otherwise unacceptable data values. Several embodiments may facilitate such human interaction in conjunction with a multiple-layer display of data in the context of a target document portion from which SR or other OMR data may be extracted. A single bitmapped layer may be created in which respective sets of bits within each bitmapped pixel may represent multiple layers, such that a human responsible for the resolution may easily change the display to include/exclude layers and/or to change emphasis between the layers and/or data presented therein.

Figure 7C:
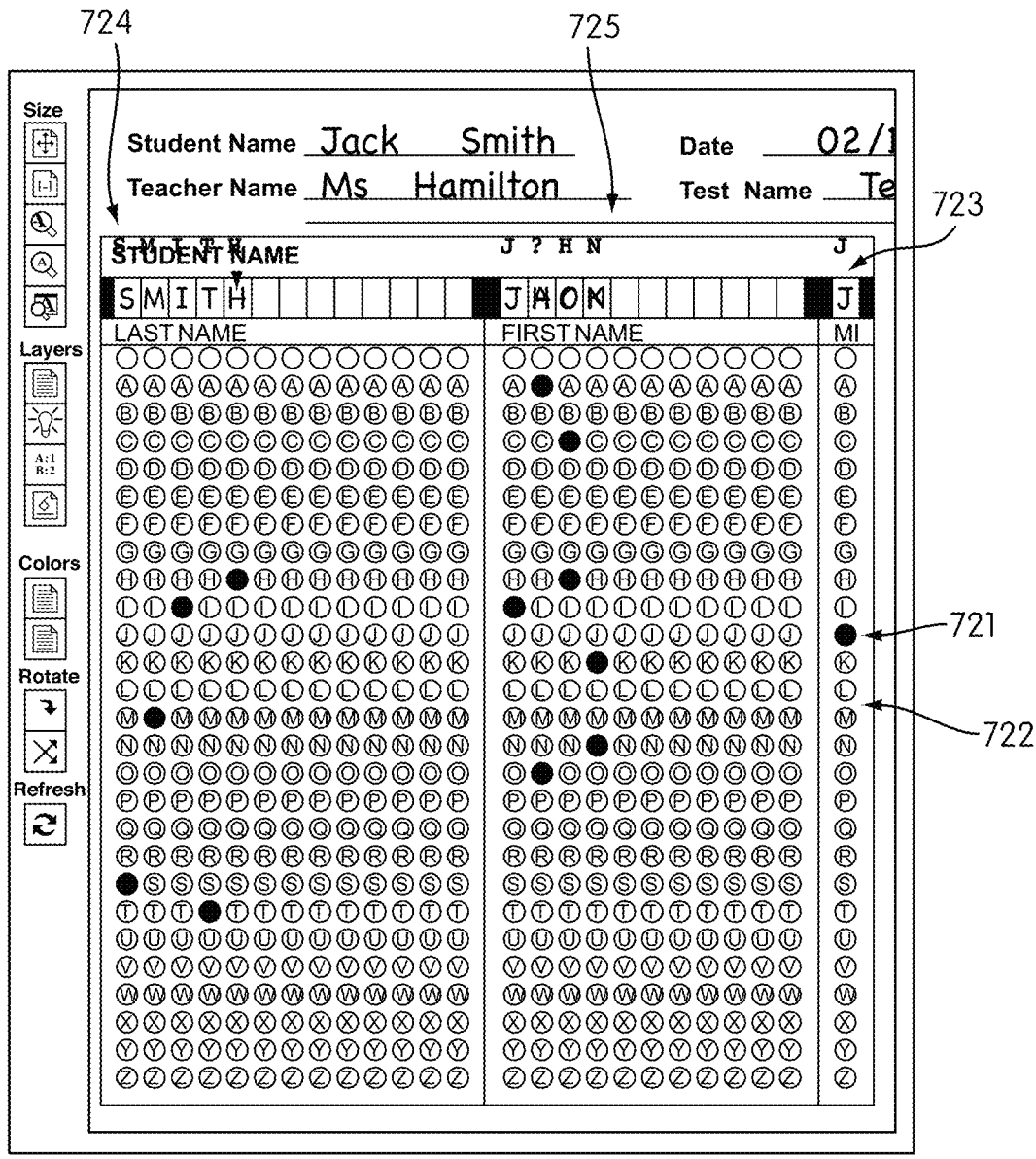
FIG. 7C illustrates an example of a presentation of a target document portion for which derived values have been determined and are further presented, according to an embodiment of the invention.

As one exemplary application, FIGS. 7a-7c illustrate an embodiment in which five layers may be combined into a single composite bitmapped image. FIG. 7a shows a table delineating how 8 bits corresponding to each pixel may be associated with the different layers, FIG. 7b shows the contents of each layer as a separate image, and FIG. 7c shows a composite image as it may be displayed on a computer screen. As shown in FIGS. 7a-c, layers may include student markings 701, 711, 721, underlying static content of an underlying form 702, 712, 722, any extracted data 703, 713, 723, 704, 714, 724, and/or any derived data 705, 715, 725, and one or more of the layers or portions thereof may be presented automatically and/or with user intervention (e.g., selection).

In a similar manner, for CR or CCR items, there are a number of derived data extraction processing techniques available. As noted above, a common technique is to have human readers or evaluators view a captured image of at least a portion of a response document that contains one or more targeted student responses and assign a score by examining the response(s) in the context of scoring rules (which rules are typically referred to as a "scoring rubric"). As with human reviewing of OMR responses, the techniques disclosed herein may be used in conjunction with human readers or evaluators assigning scores to CR items.

Figure 8A:
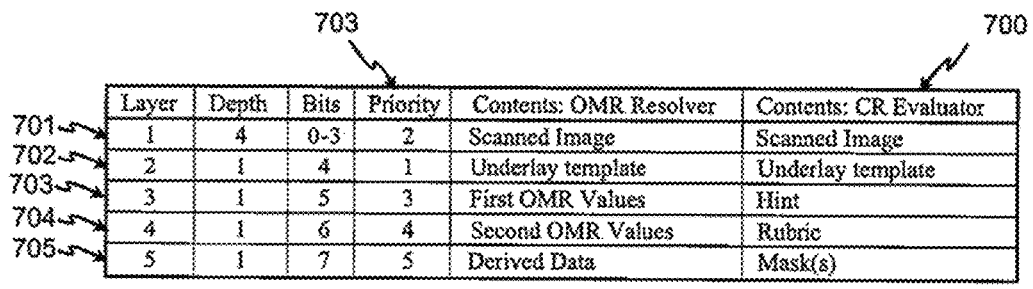
FIG. 8A illustrates a chart including criteria for a display of bitmapped images consisting of multiple layers mapped into each pixel of the bitmapped image for derived data extraction of an OMR field or a constructed response field, according to an embodiment of the invention.
Figure 8B:
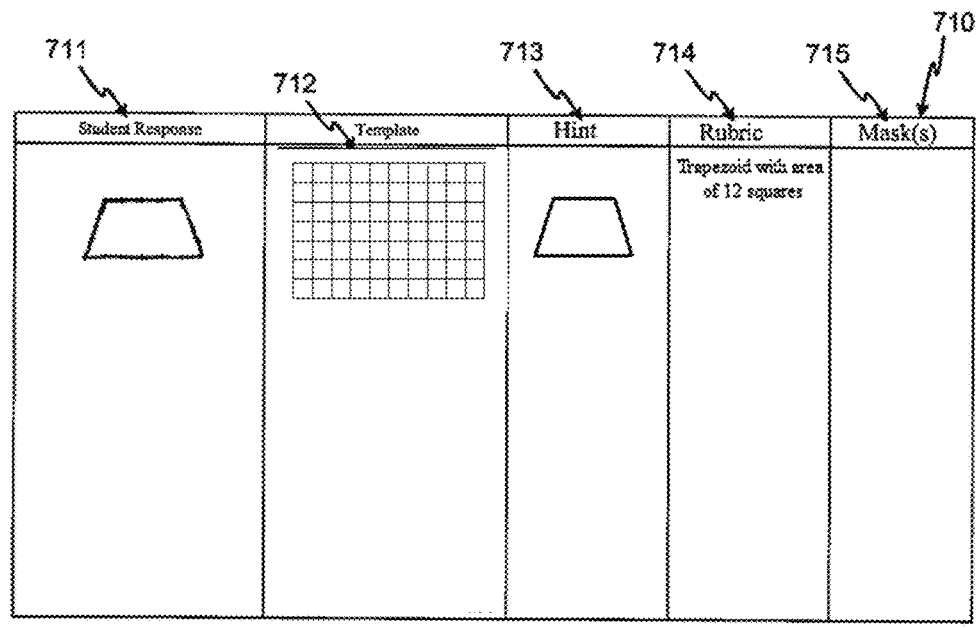
FIG. 8B illustrates a display of bitmapped images consisting of multiple layers mapped into each pixel of the bitmapped image for derived data extraction of a constructed response field, according to an embodiment of the invention.
Figure 8C:
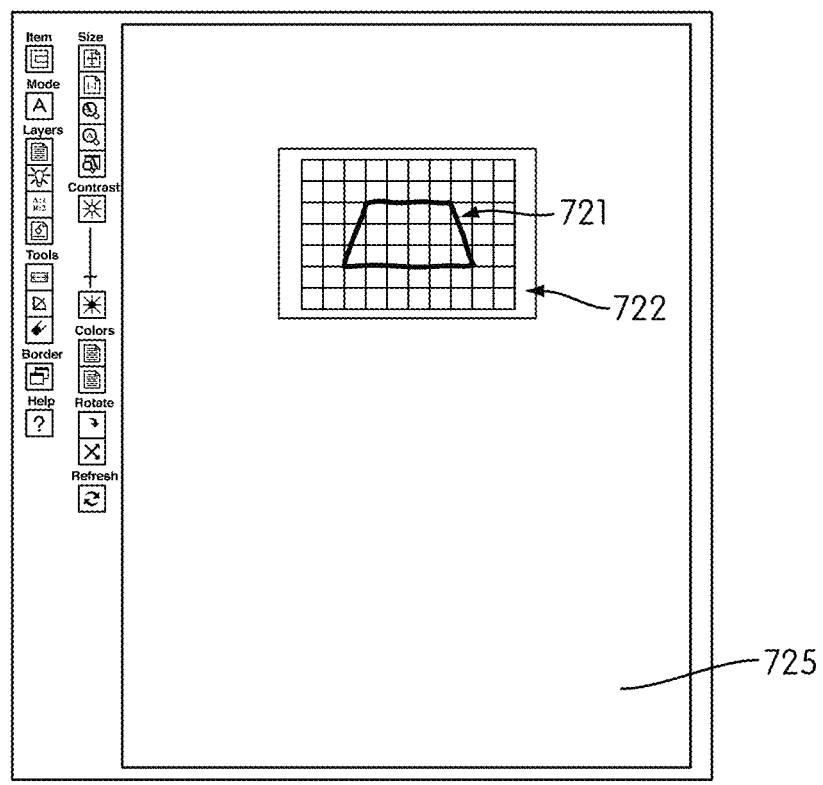
FIG. 8C illustrates an example of a MEP processed target document portion that may be presented, according to an embodiment of the invention.

As one exemplary application, FIGS. 8a-8b show how five layers may be combined into a single composite bitmapped image. FIG. 8a shows a table delineating how the 8 bits within each pixel are assigned to the different layers, FIG. 8b shows the contents of each layer as a separate image, and FIG. 8c shows the composite image as it may be presented on a computer screen or other suitable presentation device. As shown, the layers may include the student markings 701, 711, 721 the underlying static content of the form 702, 712, 722 any "hints" to show responses for which credit may be given 703, 713 the scoring rubric 704, 714, 724 and/or any masks to hide data that may distract or bias the reader 705, 715, 725.

Once the reader or evaluator ("reviewer") has decided upon a score, the reviewer may enter a score using a keyboard, or mouse although any suitable recording device including a digital pen or tablet may be used (e.g., including but not limited to those illustrated in FIG. 6). There are numerous other CR items or CCR items in which a presentation to a reviewer may be different. For example, if a student responds orally using a microphone, telephone, or similar recording device, the reviewer may be presented with the student's response over a headset or microphone, although a derived data extraction processing may have converted the response from analog or digital representations of the student's voice to textural or other multimedia form(s). As another example, if the student creates a 3 dimensional object, the reviewer may be presented with a representation of the response on the computer screen in the form of a movie or a three-dimensional rendering of the object (or otherwise in accordance with one or more presentation media, devices, administrative applications, and so on that may be used).

For CR items and other response areas other than OMR, there are a number of derived data extraction processing techniques that may be used, depending on the type of extracted data and/or derived data that are available. If the data are verbal in nature, but not in the form of text, then ICR, OCR, manual key-entry, voice recognition, handprint recognition and/or other techniques may be used to convert the data to text. If the data are available as text, then pattern matching, word recognition, syntactical, latent trait, and other text based techniques may be used to assign scores. If the data are available as images, then image analysis may be performed.

Figure 8D:
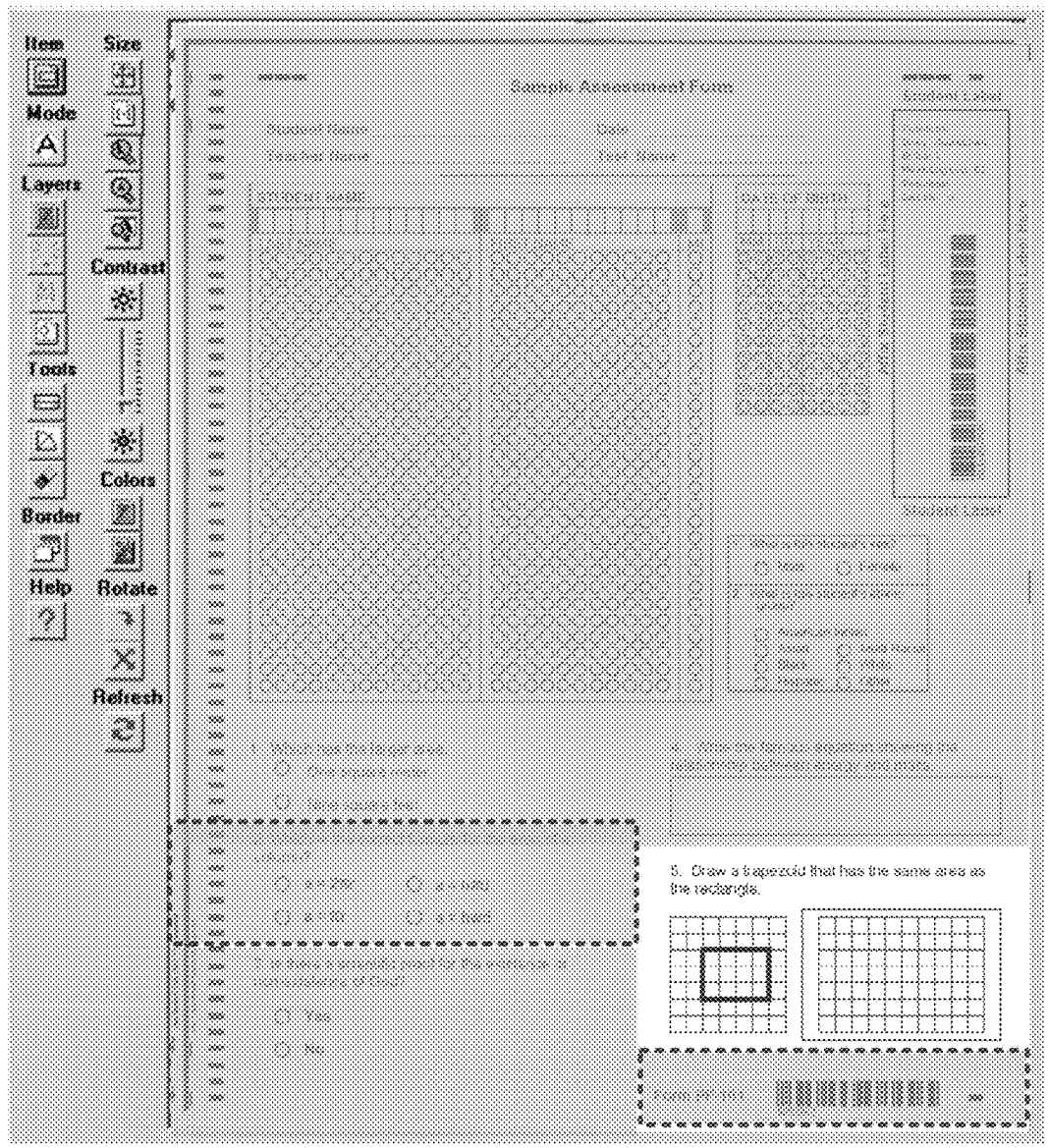
FIG. 8D illustrates an example of a MEP processed target document portion that may be masked in conjunction with presention, according to an embodiment of the invention.

Turning now to FIGS. 8c and 8d, there are seen examples of selective presentation and data-masking respectively according to embodiments of the invention. Beginning with FIG. 8c, various processing may also be provided by an MEP system (e.g., an MEP interface) for enhancing the reliability, security or validation of MEP or other processing (e.g., scanning, scoring/performance evaluation, system creation/maintenance, and so on) that may be conducted by a human reviewer or other human user. Specifically, a human reviewer or other user may be desirably provided with opportunity to view a target document. The MEP system may provide for such viewing by presenting a pertinent portion of the target document, for example, one or more of demographic information or item information, or further, presenting such information in a particular manner to facilitate such viewing (e.g., magnified, transposed, aligned, enhanced, and so on). Similarly, such presentation may further include avoiding presenting other information that may distract the user, reduce available presentation space for more pertinent information, cause or create the perception that the user may conduct such viewing purpose according to non-pertinent information (e.g., resolving a discrepancy, scoring, and so on based on a user, user group, non-target or unrelated item, and so on). The MEP embodiment of FIG. 8c therefore provides for presenting only those portions (e.g., that portion) of a target document or target documents that are pertinent to the user's prescribed use or for documenting for validation that only those portions were available/presented to the user generally, according to applicable time/event conditions, and so on, or some combination. FIG. 8d also provides for presenting only those portions of a target document or target documents that are pertinent to the user's prescribed use or for documenting for validation that only those portions were available/presented to the user generally, according to applicable time/event conditions, and so on, or some combination, but does so by masking one or more other portions of the target document(s). It will be appreciated that further mechanisms or combination of the mechanisms of FIGS. 8c and 8d or such further mechanisms may also be used in accordance with the requirements of a particular implementation.

Figure 9:
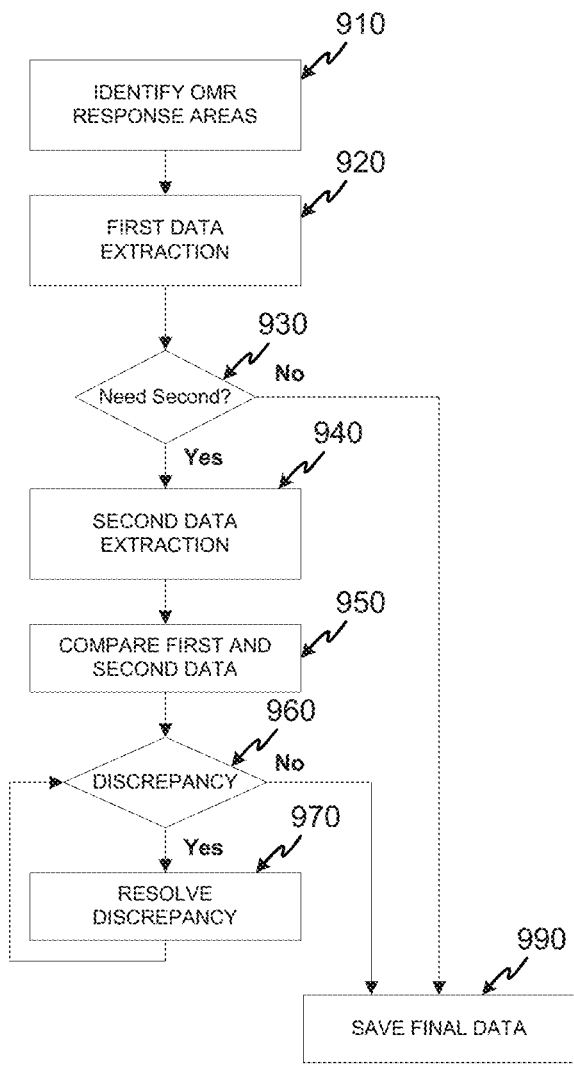
FIG. 9 is a flow diagram illustrating a redundant data capture method according to an embodiment of the invention.

Resource Allocation Engine:

While embodiments may use discrete and/or sequential processes, another mechanism for controlling extraction processing, derived data extraction processing, and evaluation processing is to utilize a "resource allocation engine". FIG. 9 shows a simplified flow-chart illustrating an embodiment of discrete or sequential processes suitable for use in a multiple extraction or redundant data extraction embodiment of the invention as described above. In such an embodiment, one or more OMR response areas are located (910) and there is a first extraction processing (920) of one or more of the OMR response areas, which extraction processing includes determining a confidence indicator and evaluating the indicator.

If the confidence indicator indicates that additional processing is warranted (930), then a second extraction processing is conducted (940) and an evaluation processing is conducted to compare the extracted data values from the first extraction to the corresponding data value from the second extraction, thereby identifying whether the data values are discrepant (950). (Note that the degree of discrepancy may also be significant in a particular instance and may be analyzed against a predetermined or dynamic discrepancy rule, such that only a "significant" discrepancy may require resolution or different degrees of significance may be associated with different needs for resolution, different resolution processes, different allocation of resolution-providing resources, and so on. Also note that here, as with elsewhere herein, other than two extraction processing instances may be conducted in accordance with a multiple extraction embodiment.)

If a discrepancy is found (960), then business rules may be invoked in conjunction with an attempt to resolve the discrepancy (970). If instead a (significant) discrepancy is not found, e.g., initially or responsive to resolution (970), then the extraction processing data corresponding to the resolution is determined to be final data and the final data is saved (990).

In block 990, the available final data are stored, including the final OMR values for each processed response area 990. The data may also include flags for unresolved discrepant data, the OMR values, indicators for the first and second extractions, or other pertinent extraction processing data.

Figure 10:
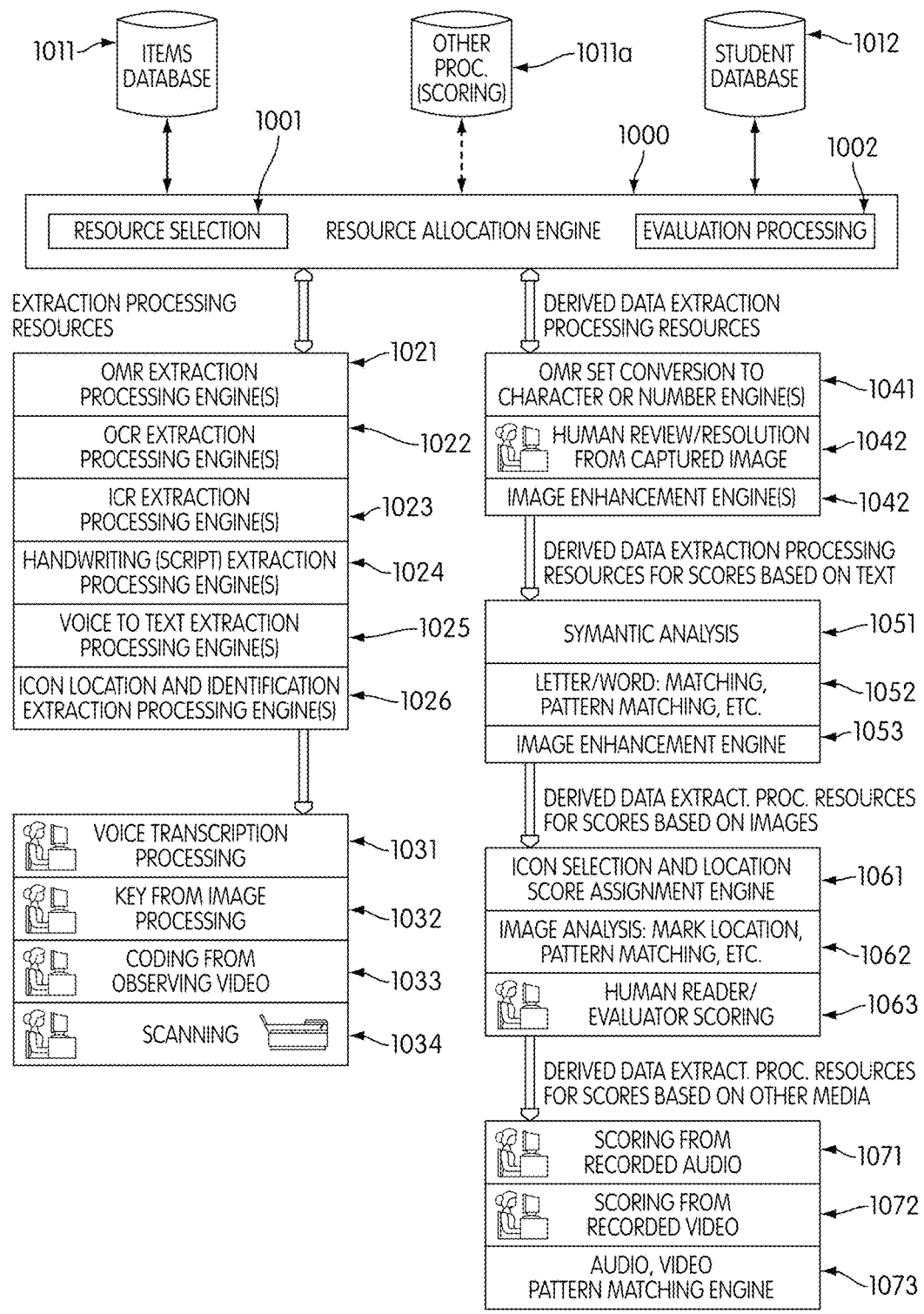
FIG. 10 is a block diagram illustrating a resource allocation engine suitable for allocation of resources for data extraction processing, allocation of resources for scoring, and suitable for a general resource allocation system, according to an embodiment of the invention.

While an application may be written to follow the steps as shown in FIG. 9, such an approach may yield an unacceptable number of unresolved discrepancies or untrustworthy values, force an unsupportable resolution of discrepancies, yield untrustworthy derived data, and may be difficult to change once coded into a computer program. FIG. 10, therefore, presents an embodiment of a resource allocation engine that may be used to control the extraction of OMR data as shown in FIG. 9.

In the FIG. 10 example, "resource allocation engine" 1000 serves as an exemplary mechanism for determining, assigning, initiating, reporting, scheduling, and so on ("managing") those human, electronic or electro-mechanical resources that may be utilized in conjunction with extraction processing. Resource allocation engine 1000 may further provide for interacting with or further managing other processing that may be conducted in conjunction with extraction processing, e.g., as with system 100 (FIG. 1) or 1100 (FIG. 11) components or other suitable mechanisms in accordance with the requirements of a particular implementation that may utilize extraction processing. It will be appreciated that resources of more integrated or more distributed systems may also be similarly managed by engine 1000.

As shown in FIG. 10, engine 1000 is operable in conjunction with a first database 1011 or other storage ("extraction parameter database") that includes target information indicating OMR responses areas that may be processed, sets of OMR response areas that may be combined in obtaining derived data, and business rules according to which extraction of data, determination of derived data from OMR response areas, evaluation and the like may be conducted. Engine 1000 is also operable in conjunction with a second database 1012 or other storage ("student database") that includes information corresponding to one or more document users, and may also operate in conjunction with one or more other databases or other storage ("other processing database") 1011a corresponding to the aforementioned other processing, the common or separate resources of which engine 1000 may inter-operate or further manage.

In one embodiment, the process starts with engine 1000 obtaining from database 1011 information about the document being processed and the set of OMR response areas from which an initial extraction processing is required. (Note that similar implementations may be utilized in conjunction with extraction processing that may be conducted by a scanning system, coupled computer, and so on. Scanning system based, distributed or other implementations utilizing control/data transfer or storage conducted by or with external components may be conducted in an otherwise conventional manner for conducting real-time or non real-time transfer or storage in other applications.)

In one embodiment, dynamic "objects" are created for each such OMR response area, for each set of OMR response areas from which derived data may be extracted (e.g., a set including one or more corresponding items, item responses, and so on), and for the target document being processed. Additional objects may be created for the project being processed, each page within the document, each sheet within the document, each sheet side or other document portion, and so on (e.g., including any affixed document portions as may be applicable in a given instance).

Once the necessary data have been retrieved from the database, engine 1000 utilizes an internal or external resource selection processing 1001 to select a particular OMR extraction processing 1021 to be the first extraction processing for each OMR response area. The selection may be based on a setting within the OMR response area object, a setting within the object for a set of OMR objects, a setting specific to the document, or a setting specific to another object or from other data stored within the database, a result from an evaluation processing 1002, some combination of the above, or other appropriate criteria. The selection may also be the same or different for different response areas.

The OMR extraction processing may utilize a specific OMR extraction processing engine from a set of one or more OMR extraction processing engines or techniques 1021 that are available, and may determine such engine(s) or technique(s). A selected extraction processing may include specific parameters that are passed to the extraction processing engine to control the extraction processing such that the same engine may perform multiple extractions from the same captured image. As part of the extraction processing, the extraction processing engine will generally assign a numeric value for the extracted OMR at each position and may also assign a confidence indicator for each. (As discussed with reference to FIGS. 5*a-f*, for example, a response area may correspond to one or more than one position and extraction processing may be conducted using a process, positioning or otherwise with reference to such position or positions). These data are then returned to the resource allocation engine for further processing.

Each time data are returned to resource allocation engine 1000, the engine utilizes an integrated or external evaluation processing 1002 to (a) compare data against pre-determined evaluation criteria, (b) calculate evaluation criteria prior to such comparison when the criteria are dynamic, (c) compare one set of data to another, or (d) conduct other processing that may be appropriate to determine sufficient flags, values, indicators, or other data sufficient to identify an end state for processing or, alternatively, sufficient for a resource selection processing 1001 to select a next resource. Following the outline of FIG. 9, upon return from the first extraction, the resource allocation engine utilizes an evaluation process 1002 to determine which (if any) of the extracted OMR values may be trusted based on the first extraction alone. If there are one or more extracted OMR values that may not be trusted, the resource allocation engine utilizes the resource selection processing 1001 to select a second OMR extraction processing and call either the same extraction processing engine with different parameters or another OMR extraction processing engine to perform the second extraction. The same OMR extraction engine may, for example, be allocated to check for responses not within the designated response area as shown in FIG. 5*b* and FIG. 5*c*.

Following second extraction, the resource allocation engine 1000 may again utilize an integrated or external evaluation processing 1002. In this case, the evaluation engine may compare the extracted data from the first and second extractions to identify discrepancies. If one or more discrepancies are detected, in strict limitation of the processing of FIG. 9, the resource selection processing 1001 will send each discrepant OMR response area object to one or more derived data extraction engines designed to provide a resolved OMR value 1041. The first such engine may include an automated system employing business rules, and may return a new value for the OMR and a confidence indicator. Once again, the resource allocation engine may perform an internal or external evaluation process 1002 to determine whether the discrepancy has been adequately resolved, which resolution would indicate the end of the extraction processing. If the discrepancy is not adequately resolved, and if additional resources are available, the resource selection processing 1001 may utilize additional derived data extraction engines, and may possibly send the discrepant OMR response area object for human review and resolution 1042 as shown in FIG. 7. Once the discrepancy is resolved, or once all available derived data extraction engines suitable for resolving the discrepancy have been utilized, the final data are ready for release for downstream processing. Further extraction processing instances may also be similarly conducted.

(Note that other embodiments may provide a resource scheduler for scheduling resources that may or may not be "available" at the time of scheduling or when the data becomes available. The scheduler may provide for scheduling internal, external or distributed processing according to real-time or non real-time data/resource or data/resource set availability, component/reviewer capability or status, processing coordination, reviewer training, business rules or other time/event criteria, and may further provide for resolving scheduling conflicts in an otherwise conventional manner for resolving scheduling conflicts.)

If the first extraction is performed within the scanning system, such as a mechanical/digital OMR extraction as provided by Pearson and others, the resource allocation process may begin after the first OMR data extraction is complete or otherwise in accordance with the requirements of a particular implementation.

While the above description explains how a resource allocation engine may replace a "hard coded" flow, e.g., according to FIG. 9, the resource allocation engine process permits a much more robust and powerful control of the same or different OMR extraction (or other extraction processing) to enhance the confidence of the final data derived from the OMR processing. As described above, the resource allocation engine may first obtain the first OMR data extraction, either as initially captured by a mechanical/digital OMR extraction within the scanner or from a selected first OMR extraction processing. Then, however, the next processing may vary from one document to another or from one instance to another as there are many more resources available to the resource allocation engine other than those shown FIG. 9.

In one scenario, the resource allocation engine may select a second OMR extraction processing 1021 at the same time as the initial OMR extraction processing. Such an additional OMR extraction may be based on the same response areas as the first extraction, or on different response areas such as shown in FIG. 5. In other sequences, such additional extraction may be deferred until deemed required based on evaluation processing.

In another scenario, the resource allocation engine may select a derived data extraction processing to convert one or more sets of extracted OMR values to characters or text 1041 before additional extraction processing and/or before discrepant or untrustworthy resolution of extracted data. With both extracted data and derived data, an evaluation process 1002 may be able to determine a highly trusted final outcome for a given OMR field although individual extracted OMR values within the set of OMR values that determine the field may be individually untrustworthy. For example, in FIG. 7c, the fourth column of the first name contains a questionable mark representing the letter "K". If the derived character for this field is determined to be "N" by one or more derived data extraction processing functions based on two data extraction processing processes, the evaluation processing may be able to find a trusted result despite the apparent discrepancy in the extracted values. In this instance, the first extraction yielded values of 14 and 15 (shown in Hex format as E and F) respectively for the response positions corresponding to "K" and "N". These values would normally be deemed too close to each other to differentiate. In the second extraction, the same response positions returned the values of 13 and 15 (shown as D and F). While this difference of 2 might also be insufficient to trust that the darker mark is trustworthy, the two combined may be sufficient.

As shown in FIG. 10, resource allocation engine 1000 also has an extraction process identified as "scanning" 1034 so that, if there are final data that are not trustworthy, engine 1000 may cause at least some portion of the document to be scanned again using the same or different scanner and with the same or different alignment or other parameters, or other software. Alternatively, engine 1000 may cause one or more ICR data extraction processing engines 1023 to be used to determine the letter written above the column. Even if such a derivation is not, in itself, trustworthy, if the derived data from one or more sets of OMR data values matches the extracted data from ICR, the processing engine may be able to determine a trustworthy result without requiring another scan 1034 or human intervention 1042, 1032.

Unlike the process in FIG. 9, a process controlled by a resource allocation engine may also exploit information corresponding to one or more respondents. For example, since the data from an extraction process may include data corresponding to all extracted marks, the resource allocation engine may cause an evaluation process 1002 to determine the types of marks made by a specific respondent (or respondent group) and dynamically adjust evaluation criteria corresponding to the determined types of marks. Other information corresponding to one or more respondents or respondent groups may also be available in student database 1012.

Another resource allocation engine embodiment provides enhanced control over scoring of CR items through a scoring portion or "scoring resource allocation engine" that may operate in a more independent or coordinated manner with the aforementioned extraction engine portion (e.g., where resources are shared, where scoring result "feedback" is utilized as criteria for determining whether further extraction processing should be conducted, and so on).

In one embodiment, when there is a CR item such as a captured image of a portion of a document containing a CR item, the scoring resource allocation engine is used to control the assignment of one or more scores or categorizations. A traditional approach to this task may be to first check for a blank response, then employ one or more human evaluators, and then compare the results to identify any discrepancy. In the context of a scoring resource allocation engine, each of these same steps may be followed, but the scoring resource allocation engine provides additional flexibility and capability.

Once a CR item is identified as in need of a score, the scoring resource allocation engine may first identify a set of potential scoring resources that may be appropriate for the item. Such resources will generally be specific instances of derived data extraction processing. If the extracted item data is in the form of a digital representation (image) of a portion of a document containing the CR item response area, appropriate scoring resources that may assign a score or classification based on the captured image may include, among others, (a) an image analysis engine suitable for classifying the response as blank or non-blank 1062, (b) a human reader or evaluator 1063 who assigns a score or classification to the response based on viewing the image of the response on a computer screen 1063, (c) an image analysis engine suitable for locating, determining, and classifying marks within the response area 1061, 1062. If the CR item utilizes CCR with "stickers" or comparable manipulation, Icon identification and location 1026 may be used to provide derived data suitable for scoring based on Icon selection and location pattern matching or other suitable processes for assigning a score 1061 as taught in Tidwell-Scheuring, U.S. Pat. Nos. 8,086,166 and 7,056,124.

If the CR item is in text form, appropriate scoring resources that may assign a score or classification might include, among others, (a) letter pattern matching, word matching, word pattern matching or other letter or word based classification 1052, semantic analysis 1051, latent trait analysis, artificial intelligence (AI), fuzzy logic, or other text-based analysis techniques 1052. If the extracted item data is in the form of a digital representation (image) of a portion of a document containing the CR item response area, additional data extraction processes can be used to convert the response to text such as OCR 1022, ICR 1023, handprint recognition 1024, and keying from image procedures 1032.

As shown above, there may be a number of paths of one or more scoring resources that may be called upon to assign a score or category to a given CR item. One function of the scoring resource allocation engine, therefore, is to identify all such paths and determine the best single or multiple sets of such paths for any given CR item. This determination may include not only information on which possible paths may be appropriate, but also the financial, resource utilization, resource unavailability or other cost of each option, the time that it will take for each option, the likelihood of a successful determination of a score or classification for each option, and the likely validity and reliability of such a determination. In addition, the scoring resource allocation engine may have information on the particular document or on the context in which the document is administered that may influence the selection process. For example, if an item is used for a practice test, a relatively inexpensive, but less reliable, automated scoring engine may be selected over a human reader while when that same item is used in the context of a high stakes test, the more expensive option or both options may be selected to ensure the veracity of any final scores. Yet further information on the respondent may further influence the selection process, such as requiring more stringent criteria to identify a score as trustworthy for those who are near a cut point as shown by Patz and Poor in U.S. Pat. No. 7,149,468.

In a more generalized implementation of a resource allocation engine for data collection and scoring of assessments, a single resource allocation engine may be utilized for both data extraction and scoring as shown in FIG. 10. In this embodiment, additional resources become available. For example, if a CR item is deemed to be blank, the resource allocation engine may evaluate several options including re-scanning as a new initial extraction processing 1034, and/or additional image analysis of the captured image to enhance an image that otherwise yielded untrustworthy results 1053. As also indicated in FIG. 10, the embodiments are not limited to marks on paper but may include other appropriate extraction and scoring resources. For example, when audio recording is used, derived (text) data may be created for scoring by text-based processes such as 1051-1052, by one or more voice to text extraction processing engines 1025, and/or human voice to text transcription 1031. Alternatively, recorded data may be directly evaluated and scores or classifications assigned by either human readers 1071, or by automated processing engines 1073. Similarly, resource allocation may be based on video data with human 1072 or automated processing engines.

It will be appreciated that the embodiments of the invention are not limited to marks on paper, but may include audio, video, responses made with input devices attached to a computer or other digital device including keyboard, mouse, touch-screen, touch pad, stylus, digital pen, or any other medium in which a respondent might indicate a response to an assessment item or task.

It will also be appreciated that the possible extraction processing engines, derived data extraction processing engines, resource selection processing, and evaluation processing, are merely a representative set of such resources. Such resources may vary from very simple sequential procedures to more complex processing. For example, an OMR extraction processing engine may simply determine the total darkness of the marks within a defined target area. Other OMR extraction processing engines may utilize conduct filtering-based, fuzzy logic, other AI pattern recognition, edge detection, or other processing within a designated response area and/or may use multiple response areas based on the designated target area, and/or utilize differential processing depending on the position of any identified markings relative to the defined target area or relative to specific portions of the defined target area.

Figure 11:
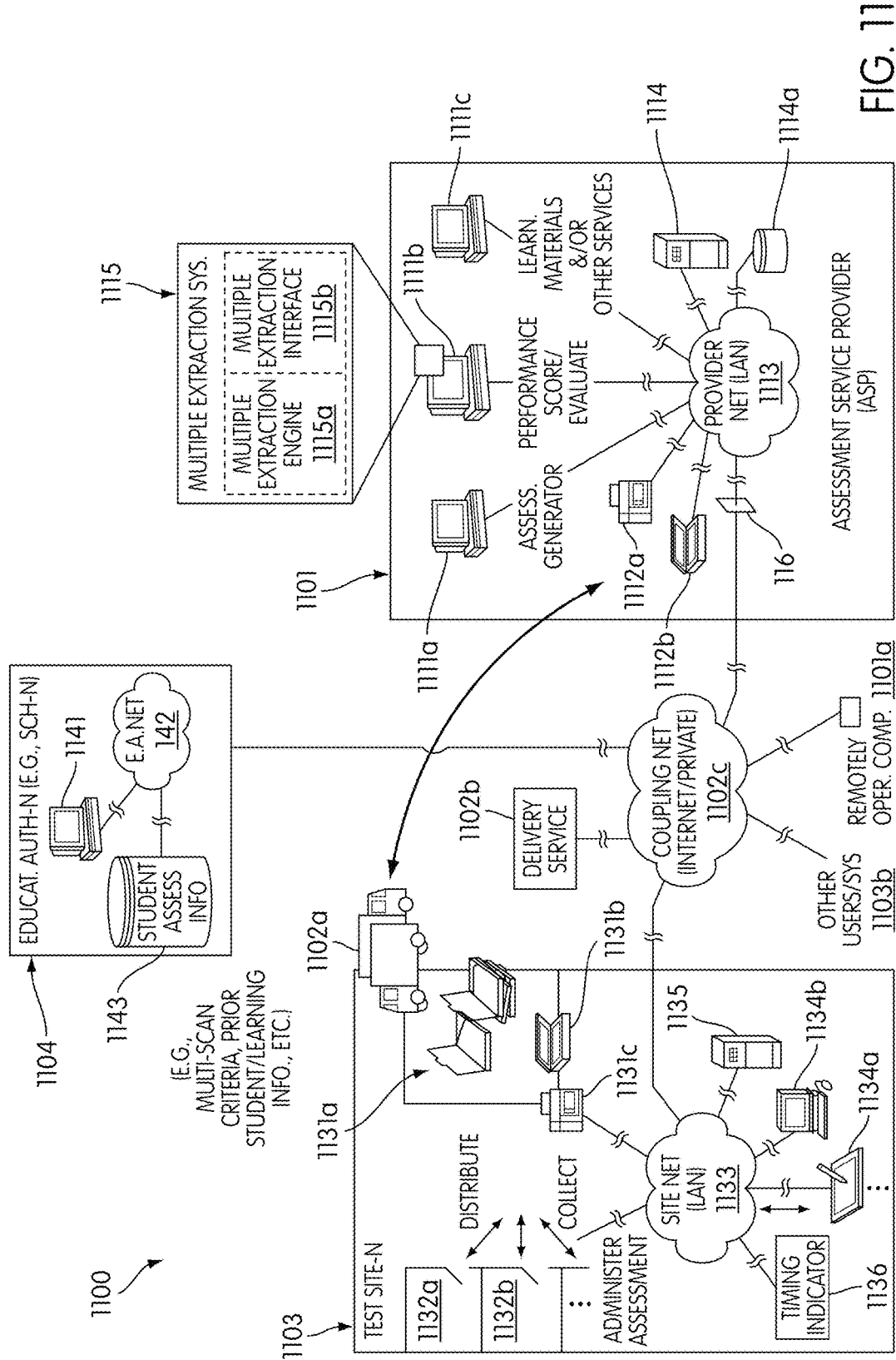
FIG. 11 illustrates an example of a more complex system of assessment processing and related functions in which embodiments may be embedded, according to an embodiment of the invention.

FIG. 11 illustrates an example of how multiple extraction processing may be embedded within a larger, more integrated or distributed system that may support assessment or other applications. Learning system embodiment 1100, for example, provides, among other aspects, for generating or further administering hardcopy, electronic or combined assessments or other learning, or for conducting other processing relating thereto. System 1100 also provides for receiving wholly or partially completed, administered assessments (also referred to herein as, "completed" or "administered" assessments), and for performing multiple extraction processing of assessment item responses or other assessment or learning information ("marks") that may be written, typed, stamped, printed attached or otherwise affixed to such documents, or for receiving and performing multiple extraction processing on uncompleted assessments, texts, electronic books, games, completed/uncompleted study or homework materials, diagrams, packaging, delivery or audio/video material, electronic instruction or other learning-related documents or portions or combinations thereof. System 1100 also provides for scoring or otherwise evaluating generated/administered assessments or other learning information in accordance with or in conjunction with multiple extraction processing. Extraction processing may also be performed according to one or more of statically predetermined or dynamically received, adaptive, analyzed or otherwise determined education authority, assessment service provider, administration-related or other extraction processing, scoring or other learning processing criteria.

As shown, system 1100 includes one or more each of assessment service provider systems 1101, test sites 1103 and education providers or other learning authorities 1104), which systems are at least intermittently coupled by one or more delivery systems 1102a-c. Broadly stated, assessment service provider system ("ASP") 1101 provides for conducting assessment generation, scoring or other evaluating, or other learning information processing, including multiple extraction processing, and for analyzing or otherwise compiling assessment or other learning results and providing such results or other learning information to education authority 1104. Test site-N 1103 provides at least one location or system for administering an assessment or other learning. Education authority 1104 provides a source of standards or other static/dynamic criteria according to which multiple extraction processing, evaluating or other assessment or other learning information processing may be conducted, and may provide a source, learning institution or overseeing agency of or for students/learning.

Among the remaining illustrated system 1100 components, delivery services 1102a-b and coupling network 1102c respectively provide for delivering assessment or other learning information in hardcopy and electronic form, as applicable, among or otherwise between the aforementioned systems 1101, 1103 and 1104, and may provide for conducting monitoring/reporting corresponding to such delivery. (One or more of delivery systems 1102a-c may, for example, provide for delivering non-administered assessment documents or information pertaining thereto from ASP 1101 to test site-N 1103 and returning completed assessment forms, responses or administration occurrence, criteria or other information pertaining thereto from test site-N 1103 to ASP 1101.) Various remote students, teachers, institutions, administrators, other users 1103b, or remote system 1100 components, e.g., 1101a, may also interact with systems 1101, 1103 or 1104, for example, via one or more of delivery mechanisms 1102a-c. Such persons/system components may, for example, provide for administering/taking assessments, conducting generating, extraction processing, evaluating, reporting or delivery, participating in other hardcopy or electronic (e.g., computer or online) learning, and so on, or some combination. Each of the above systems, as with other systems or components discussed herein, may further operate in a localized, mobile, or distributed manner, and may operate automatically, e.g., programmatically, or with user intervention.

ASP 1101 more specifically includes assessment generating system ("assessment generator") 1111a, performance scoring/evaluating system ("scoring system") 1111b, learning materials and/or other learning service providing system ("LMS system") 1111c, printing system 1112a and scanning system 1112b, which are at least intermittently coupled for communication via ASP network 1113 to each other and to coupling network 1102c. ASP also includes server 1114, ASP storage 1114a and firewall 1116, which are also at least intermittently coupled for communication via network 1102c.

Assessment generator 1111a more specifically provides for selecting, retrieving (e.g., from storage 1114a), compiling, creating layout or otherwise generating assessments. In various embodiments, assessment generator 1111a may also provide for generating one or more SR, CR or other items that may be used in generating one or more assessments or as part of generating one or more assessments, or for generating one or more of rubrics or further scoring, documenting, criteria or other scoring/evaluating or other instruction. Such instruction may, for example, be used by scoring system 1111b, human reviewers or both in conducting multiple extraction processing or scoring or other evaluating of assessments, or by Learning Materials &/or Other Services 1111c (LMS) or other system 1100 components in conjunction with conducting their respective operation. Assessment generation criteria may be determined in a suitable manner by ASP 1101, or such criteria or a basis for such criteria may be received from other system 1100 components by ASP 1101 via one or more of delivery mechanisms 1102a-c.

Assessment generator 1111a may also provide for initiating or otherwise conducting storing/retrieving of one or more assessments or other information pertaining thereto to/from ASP storage 1114a, or delivering or receiving such information to/from one or more other system 1100 components. Storage/retrieval may, for example, be conducted in conjunction with one or more of test site-N 1103 (e.g., for administration), scoring system 1111b (e.g., for multiple extraction processing or other evaluation of one or more uncompleted/completed pretest or other assessments, rubrics or other learning information), LMS 1111c (e.g., for use in generating or testing instructional, study or other product/service based learning information), remotely operable or otherwise remote ASP components 1101a other users/systems 1103b (e.g., see above), education authority 1104 (e.g., for verification, intervention, review, conducting learning, etc.), and so on. Other information may, for example, include but is not limited to instruction, explanation, delivery confirmation, condition or other delivery status, and so on, or some portion or combination thereof.

Assessment generator 1111a may also generate, associate, store or initiate or otherwise cause delivery of (hereinafter, "deliver") one or more assessments or related information or portions thereof to test site 1103 or other system 1100 components. (In other embodiments, such delivery may also be conducted by other ASP or other system 1100 components.) Assessment generator 1111a may generate, associate, store or deliver learning information as an integrated whole, having separable or match-able versions, addenda or other sub-parts (e.g., assessment portions that may be administered to the same or different targeted students/groups), and so on, and may generate, associate, store or deliver such portions in raw or processed hardcopy, electronic or combined form.

Assessment generator 1111a or other system 1101 components may, for example, deliver hardcopy assessments or some portion thereof by causing electronic assessment portions to be printed by printing system 1112a for physical delivery by service 1102a to test site-N 1103. Assessment generator may also deliver portions by electronic transfer via network 1102c to test site-N 1103, for example, in conjunction with "on-site" printing using printing system 1131c, which generator 1111a may but need not control. (On-site printing/control may, for example, also be conducted by one or more of system 1103 components and human administrators.) Assessment generator 1111a may also deliver assessment portions electronically, for example, by transfer via networks 1113, 1102c and 1133, via re-scanning of physically delivered assessments using scanning system 1131b, using scanning system 1112b and so on, or some combination may be used. Other system 1100 components may also provide for hardcopy, electronic or combined delivery in whole or part. Assessment generator (or other delivering system 1101 components) may but need not control or otherwise interact with one or more of scanning systems 1112b, 1131b or test site 1103 administrators. (It will become apparent that various system 1101 embodiments are also capable of receiving or conducting multiple extraction processing on "document" portions transferred or otherwise delivered at the same or different times in electronic, hardcopy or combined form, e.g., as discussed below).

Assessment generator 1111a in one embodiment also provides for generating extraction processing criteria useable in conjunction with multiple extraction processing, and which criteria may be stored (e.g., in storage 1114a) or transferred via network 1113 to scoring system 1111b or other system 1100 components. Such criteria may, for example, correspond with extraction enhancing assessment components/layout, responsive, non-responsive or not responsive mark portions, types or other characteristics ("marks") to extract, human or system processing resources to be utilized, and so on. In another embodiment such criteria may be received, generated or otherwise determined by education authority 1104 or other system 1100 components, more directly by scoring system 1111b, or some combination may be used, in accordance with the requirements of a particular implementation.

Figure 12:
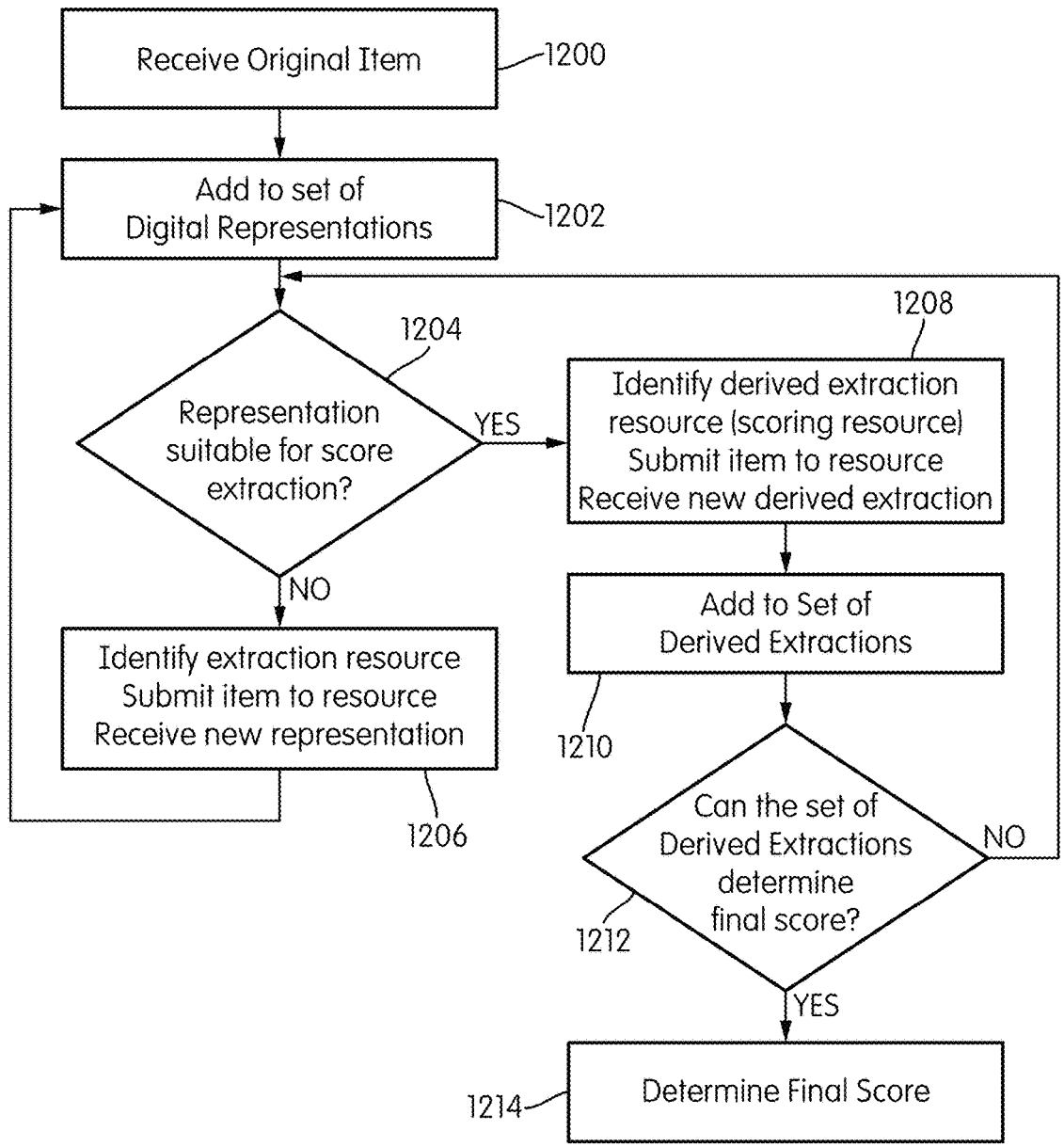
FIG. 12 is a flowchart of a resource allocation process including conditional data extraction to create one or more additional digital representations of item responses and then use of one or multiple derived extractions resources to determine scores for the items responses.

As described above, a resource allocation process can be used to assign a score to a student's response to an item. Such a process is performed by the resource allocation engine 1000 and can be represented as a flow of information, such as in FIG. 12. As shown in the figure, the process flow is initiated at step 1200 with the receipt of at least one digital representation of the student's response to an item to be processed. While there will normally be only one such digital representation of the response, there may be more than one such as in the case in which multiple extractions are based on a single scan and performed automatically before the item is submitted to the resource allocation system. All such digital representations are stored at step 1202 as the initial set of digital representations of the student response to be scored.

Along with the digital representation of the student response, the received information will also identify the item to which the student respond and may also include information on the student, the assessment, or other potentially relevant meta-data. The resource allocation engine may get such other information from one or more databases as shown in FIG. 10.

Once at least one digital representation of the response is available, in step 1204, the resource allocation initiates a first determination of whether there are one or more derived data extraction processing resources, such as one or more of the derived data extraction processing resources listed in FIG. 10, suitable to extract a score based on one or more of the digital representations of the response. This determination may be performed by the resource allocation system, or by an external evaluation resource capable of making such a determination based on the characteristics of the digital representation of the response and associated meta-data and the capabilities of each available derived extraction resource.

For example, as described above, when an item response, such as a CR item response, is identified as in need of a score, in a step corresponding to step 1208, the scoring resource allocation engine 1000 may first identify a set of potential derived data extraction processing resources that may be appropriate for the format of the item response. For example, if the extracted item data is in the form of a digital representation (image) of a portion of a document containing the CR item response area, appropriate scoring resources that may assign a score or classification based on the captured image may include, among others, (a) an image analysis engine suitable for classifying the response as blank or non-blank 1062, (b) a human reader or evaluator who assigns a score or classification to the response based on viewing the image of the response on a computer screen 1063, or (c) an image analysis engine suitable for locating, determining, and classifying marks within the response area 1061, 1062. If the CR item is in text form, appropriate derived data extraction processing resources that may assign a score or classification might include, among others, (a) letter pattern matching, word matching, word pattern matching or other letter or word based classification 1052, semantic analysis 1051, latent trait analysis, artificial intelligence (AI), fuzzy logic, or other text-based analysis techniques 1052. Alternatively, if the digital representation comprises an image of a portion of a document containing a CR item response area, additional extraction processes can be used to convert the response image to text, such as OCR 1022, ICR 1023, handprint recognition 1024, and keying, from image procedures.

Following the first determination—step 1204, if there are no available derived data extraction processing resources capable of extracting a score from any of the set of digital representations, at step 1206 the resource allocation identifies a data extraction processing resource, such as one or more of the extraction processing resources listed in FIG. 10, appropriate to convert an existing digital representation of the response to a new, different digital representation that can then be submitted to a derived extraction processing resource capable of extracting a score for the new digital representation. The resource allocation process performs this identification by matching the characteristics of the item and the existing derived representations to the capabilities of the available data extraction processing resources. This identification may be performed by the resource allocation system or by an external evaluation resource.

In step 1206, the existing digital representation is then submitted to the selected data extraction processing resource to convert the existing digital representation of the response to a new, different digital representation of the response— since this new digital representation creation was based on the first determination in step 1204, this is an example of conditional extraction.

Then, returning to step 1202, the new digital representation of the response is added to the set of digital representations so that the process can continue with the selection of an appropriate derived data extraction processing resource to determine a score for the response.

For example, as described above, if the CR item utilizes CCR with "stickers" or comparable manipulable response elements, icon location and identification extraction processing engine 1026 (an extraction processing resource as shown in FIG. 10) may be used to provide derived data suitable for scoring using a derived data extraction processing resource, such as an icon selection and location pattern score assessment engine 1061.

As explained above, and as represented at step 1204, each time data are returned to resource allocation engine 1000, the engine utilizes an evaluation processing 1002 to: (a) compare data against pre-determined evaluation criteria, (b) calculate evaluation criteria prior to such comparison when the criteria are dynamic, (c) compare one set of data to another (e.g., compare data from one extraction with data from a previous or subsequent extraction to identify discrepancies), or (d) conduct other processing that may be appropriate to identify an end state for processing or, alternatively, sufficient for a resource selection processing 1001 to select a next resource. For example, following the outline of FIG. 9, upon return from the first extraction, the resource allocation engine utilizes an evaluation process 1002 to determine which (if any) of the extracted OMR values may be trusted based on the first extraction alone. If there are one or more extracted OMR values that may not be trusted, in step 1206, the resource allocation engine utilizes the resource selection processing 1001 to select a second OMR extraction processing and call either the same extraction processing engine with different OMR processing parameters or another OMR extraction processing engine to perform the second extraction.

Once the evaluation 1204 determines that there is at least one of the available derived data extraction processing resources capable of determining a score for at least one of the digital representations, at step 1208, a specific derived data extraction processing resource is selected from the one or more derived data extraction processing resources (e.g., as listed in FIG. 10). The resource allocation process performs this selection by matching the characteristics of the item and the existing derived representations to the capabilities of the one or more data extraction processing resources. For example, when the student response is an essay, if the digital representation of the response is text, the digital representation of the response may be sent to an automated scoring engine or to a human reader, but if the digital representation of the response is an image of the handwriting, only a human reader qualified to score responses to the item is suitable to provide a score to the digital representation of the response.

As explained above, selection of a specific derived data extraction processing resource may be based on financial, resource utilization, resource unavailability, or other considerations of each option, the time that it will take for each option, the likelihood of a successful determination of a score or classification for each option, and the likely validity and reliability of such a determination. In addition, the scoring resource allocation process may employ information on the particular assessment document or on the context in which the document is administered that may influence the resource selection process. For example, if an item is used for a practice test, a relatively inexpensive, but less reliable, automated scoring engine (i.e., derived data extraction processing resource) may be selected over a human reader whereas when that same item is used in the context of a high stakes test, the more expensive option or both options may be selected to ensure the veracity of any final scores.

This selection of a derived data extraction processing resource may be performed by the resource allocation system or by an external evaluation resource.

At step 1208, the digital representation is then submitted to the selected derived data extraction processing resource, and also at step 1208 the derived extraction or score is received.

At step 1210, the received derived extraction (i.e., score) is then added to the set of derived data extractions.

Once the newly derived score has been added to the set of derived data extractions, in step 1212, the resource allocation performs a second determination to determine whether, from the set of derived data extractions, a final score can be determined. If the result of this evaluation is that a final score cannot be determined, the resource allocation process returns to the initial evaluation at step 1204 so that an additional data extraction can be performed (step 1206) if needed. Then one or more derived data extractions will be performed (at step 1208) until there are sufficient derived extractions or scores to determine a final score.

This determination may be done by the resource allocation system itself, or by an external evaluation resource.

This determination is typically done by an evaluation processing utilizing the returned scores, confidence indicators for the scores, available characteristics of the item to which the student responded, the resource that returned each score, the one or more digitized representations of the response, the student, and the assessment program.

For example, for a constructed response item, the assessment program may require a minimum of two scores so that upon receiving the first derived extraction (score), the determination will indicate that an additional score is needed. Upon receiving a second or additional derived extraction (score) the determination will apply appropriate rules on the set of scores—for example:

1. if the most recently returned score is unreliable, another score will be needed;
2. if there are only two scores that are not discrepant, a final score can be determined;
3. if there are only two scores that are discrepant, an additional score will be needed;
4. if the most recent score is from an expert reader, a final score can be determined;
5. if there are three or more scores and two or more are not discrepant, a final score can be determined.

Once the determination at step 1212 determines that a final score can be determined, at step 1214, the set of derived extractions is used to determine the final score according to the rules of the specific assessment program and the specific item within the program. Such final scores are typically stored in databases holding information about the items (1011) and the student (1012).

Various embodiments may also provide for conducting ordering or resource/timing based ones of multiple extraction processing in accordance with a fixed or determinable primacy or other mark characterization. For example, one embodiment provides for conducting an initial or other earlier extraction (or extractions), or further utilizing a more optimal extraction processing technique or techniques in conjunction with the above or other responsive, more expectable or otherwise primary intended marks, or for conducting non-initial or other more subsequent extraction or further utilizing a more optimal extraction processing technique corresponding to other ("non-primary") marks. A suitable ordering, granularity and so on of primacy corresponding to one or more mark characteristics (e.g., priority tree, n-dimensional characteristic array, resolution web and so on) may also be used.

Ones of such embodiments may, for example, provide for such operation in conjunction with hardcopy, electronic or combined assessment information, SR, CR or other items, various document components, various multimedia types, actual/alternative scoring or other evaluation, and so on, or some combination thereof, in accordance with the requirements of a particular implementation. (Other embodiments may also provide for re-scanning using a same or different scanning mechanism, scanning/correction mechanism flagging/disabling, document damage review flagging, repeated extraction processing/evaluation of an extracted mark, skipped response area checking, cluster analysis, other action, other extraction processing or some combination in the above or other combinable alternatives.) It will be appreciated that pretest, prior student assessment, assessment generation data, other prior assessment information or other learning information may also be utilized for result prediction, mark comparison or other purposes in conjunction with extraction processing, scoring or other evaluation, and so on or some combination.

While this invention has been described in conjunction with specific embodiments thereof, many alternatives, modifications and variations will be apparent to those skilled in the art. For example, it will be appreciated that they may use dedicated hardware or may be embodied as an off the shelf software package. Similarly, various steps may be performed in different orders, such as conditionally executing an extraction process versus conditionally considering the results of an extraction process.

Accordingly, the preferred embodiments of the invention as set forth herein, are intended to be illustrative, not limiting. Various changes may be made without departing from the true spirit and full scope of the invention as set forth herein.

The invention claimed is:

1. A computerized method for processing a plurality of digital representations of responses to assessment items stored in a database to derive scores for the responses by at least one derived data extraction processing resources constructed and arranged to derive a score from a digital representation of a response, said method being performed on a resource allocation engine implemented on a computer and coupled to the database and further coupled to a plurality of said derived data extraction processing resources and to a plurality of data extraction processing resources, wherein said plurality of data extraction processing resources comprise two or more of:

(a) OMR extraction processing engines(s);
(b) OCR extraction processing engine(s);
(c) ICR extraction processing engine(s);
(d) handwriting extraction processing engine(s);
(e) voice-to-text extraction processing engine(s);
(f) icon location and identification extraction processing engine(s);
(g) voice transcription processing;
(h) key from image processing;
(i) coding from observing video; and
(j) scanning, and
said plurality of derived data extraction processing resources comprise two or more of:
(a) OMR set conversion to character or number engine(s);
(b) image enhancement engine(s);
(c) symantic analysis;
(d) letter/word matching or pattern matching;
(e) icon selection and location score assignment engine;
(f) image analysis mark location or pattern matching;
(g) scoring from recorded audio;
(h) scoring from recorded video; and
(i) audio video pattern matching engine,
said method comprising, for each response of the plurality of digital representations of responses to assessment items:
(Step 1) receiving, by the resource allocation engine, a first digital representation of said response;
(Step 2) storing, by the resource allocation engine, the first digital representation of said response to a set of digital representations in a memory of the computer;
(Step 3) determining, by the resource allocation engine, whether said of the plurality of derived data extraction processing resources is suitable to extract a score based on said set of digital representations;

(Step 3a) if it is determined that the one of said plurality of derived data extraction processing resources is suitable to extract a score based on said set of digital representations, proceeding to (Step 4);

(Step 3b) if it is determined that the one of said plurality of derived data extraction processing resources is not suitable to extract a score based on said set of digital representations, performing the following sub-steps (i) to (iv):

(i) identifying, by the resource allocation engine, a digital representation from said set of digital representations and a data extraction processing resource from said plurality of data extraction processing resources to convert said identified digital representation to a different format;

(ii) using, by the resource allocation engine, said identified data extraction processing resource to convert said identified digital representation to a second digital representation of said response different from the first digital representation of said response;

(iii) storing, by the resource allocation engine, said second digital representation of said response to said set of digital representations in the memory; and (iv) proceeding to (Step 3);

(Step 4) selecting, by the resource allocation engine, one of said plurality of derived data extraction resources by comparing the characteristics of at least one digital representation from said set of digital representations to the characteristics of digital representations scoreable by each of said plurality of derived data extraction resources;

(Step 5) generating, by the resource allocation engine, a first score for said response by submitting the at least one digital representation from said set of digital representations to said selected derived data extraction resource;

(Step 6) storing, by the resource allocation engine, the first score to a set of scores in the memory;

(Step 7) determining, by the resource allocation engine, whether a final score can be determined from said set of scores;

(Step 7a) if it is determined that the final score can be determined from said set of scores, proceeding to (Step 8);

(Step 7a) if it is determined that the final score cannot be determined from said set of scores, proceeding to (Step 3); and (Step 8) determining the final score from said set of scores, wherein selecting one of said plurality of derived data extraction resources in (step 4) further comprises one or more of:

(a) comparing the characteristics of at least one digital representation from said set of digital representations to predetermined evaluation criteria;

(b) calculating dynamic criteria and then comparing the characteristics of at least one digital representation from said set of digital representations to the dynamic criteria; and (c) comparing the characteristics of at least one digital representation from said set of digital representations to one or more other sets of extracted data, wherein the one or more other sets of extracted data include one of a previous extraction from (Step 3b) and a previous score from (Step 5).

2. The method of claim 1, in which a digital representation from said plurality of digital representations of responses comprises at least one of:

an image of a section of an assessment document including on which a respondent has made a mark made to represent the response, an image of a section of the assessment document including on which the respondent has applied a sticker applied for a constrained constructed response item, a numeric value representing the darkness of a mark at a specified OMR position on the assessment document, an alphanumeric value representing the respondent a selection of one of a set of specified OMR positions on the assessment document, an image of a page within the assessment document, an alphanumeric representation of a keystroke, a collection of characters representing a series of keystrokes representing a word, a sentence, or an essay, a digital representation of stylus movements, an audio file, and a video file.

* * * * *